United States Patent
McNutt et al.

(10) Patent No.: US 9,824,794 B1
(45) Date of Patent: Nov. 21, 2017

(54) COMMUNICATION CABLES INCORPORATING TWISTED PAIR SEPARATORS WITH COOLING CHANNELS

(71) Applicant: Superior Essex International LP, Atlanta, GA (US)

(72) Inventors: Christopher W. McNutt, Woodstock, GA (US); Amir Sekhavat, Marietta, GA (US)

(73) Assignee: Superior Essex International LP, Atlanta, GA (US)

( * ) Notice: Subject to any disclaimer, the term of this patent is extended or adjusted under 35 U.S.C. 154(b) by 0 days.

(21) Appl. No.: 15/098,626

(22) Filed: Apr. 14, 2016

(51) Int. Cl.
| H01B 11/04 | (2006.01) |
| H01B 7/42 | (2006.01) |
| H01B 7/04 | (2006.01) |
| H01B 3/30 | (2006.01) |
| H01B 7/295 | (2006.01) |
| H01B 1/02 | (2006.01) |
| G02B 6/44 | (2006.01) |

(52) U.S. Cl.
CPC .......... *H01B 11/04* (2013.01); *G02B 6/4416* (2013.01); *H01B 1/023* (2013.01); *H01B 1/026* (2013.01); *H01B 3/302* (2013.01); *H01B 3/305* (2013.01); *H01B 3/306* (2013.01); *H01B 7/04* (2013.01); *H01B 7/295* (2013.01); *H01B 7/425* (2013.01); *H01B 7/426* (2013.01)

(58) Field of Classification Search
CPC .................................................... H01B 11/04
USPC .......................................... 174/113 R, 113 C
See application file for complete search history.

(56) References Cited

U.S. PATENT DOCUMENTS

| 3,143,593 | A |   | 8/1964  | Toto |
| 3,989,884 | A |   | 11/1976 | Friedrich et al. |
| 4,166,920 | A |   | 9/1979  | Friedrich et al. |
| 4,755,629 | A | * | 7/1988  | Beggs .................. H01B 11/085 174/115 |
| 5,442,131 | A |   | 8/1995  | Borgwarth |
| 6,074,503 | A |   | 6/2000  | Clark |
| 6,248,954 | B1 |  | 6/2001  | Clark |
| 6,639,152 | B2 |  | 10/2003 | Glew et al. |
| 7,135,655 | B2 |  | 11/2006 | Tomiyasu et al. |
| 7,238,886 | B2 |  | 7/2007  | Wiekhorst et al. |
| 7,405,360 | B2 |  | 7/2008  | Clark |

(Continued)

OTHER PUBLICATIONS

Non-Final Office Action for U.S. Appl. No. 15/155,564 dated Oct. 3, 2016.

(Continued)

*Primary Examiner* — Chau N Nguyen

(57) ABSTRACT

Twisted pair cables incorporated separators with cooling channels are described. A cable may include a plurality of twisted pairs of individually insulated electrical conductors, and a separator extending lengthwise along a longitudinal length of the cable may be positioned between at least two of the plurality of twisted pairs. The separator may include a flexible body configured to maintain the at least two pairs in a predetermined configuration. A first channel extending lengthwise may define a longitudinal cavity through the separator, and at least one second channel may extend from the first channel through the flexible body to an outer surface of the separator. Additionally, the cable may include a jacket formed around the plurality of twisted pairs and the separator.

20 Claims, 16 Drawing Sheets

(56) References Cited

U.S. PATENT DOCUMENTS

| | | | |
|---|---|---|---|
| 7,473,850 B2 * | 1/2009 | Glew | H01B 11/06 174/113 C |
| 7,663,061 B2 | 2/2010 | Gareis | |
| 8,313,346 B2 | 11/2012 | Sparrowhawk | |
| 8,558,115 B2 | 10/2013 | Jenner | |
| 8,624,116 B2 | 1/2014 | Wiekhorst et al. | |
| 8,641,844 B2 | 9/2014 | Juengst | |
| 2003/0205402 A1 | 11/2003 | Koyasu | |
| 2005/0168941 A1 | 8/2005 | Sokol et al. | |
| 2010/0200269 A1 | 8/2010 | Camp, II | |
| 2010/0236812 A1 | 9/2010 | Laudenslager | |
| 2011/0174531 A1 | 7/2011 | Rubera | |
| 2011/0259626 A1 | 10/2011 | Speer | |
| 2013/0248240 A1 | 9/2013 | Glew et al. | |
| 2014/0251652 A1 | 9/2014 | Poulson et al. | |

OTHER PUBLICATIONS

Final Rejection for U.S. Appl. No. 15/098,635, dated Sep. 28, 2017.
Non-Final Office Action for U.S. Appl. No. 16/098,635 dated May 26, 2017.

* cited by examiner

COMMUNICATION CABLES INCORPORATING TWISTED PAIR SEPARATORS WITH COOLING CHANNELS

CROSS-REFERENCES TO RELATED APPLICATIONS

This application is related to pending U.S. patent application Ser. No. 15/098,635, filed Apr. 14, 2016 and entitled "Communication Cables Incorporating Twisted Pair Separators," the contents of which is incorporated herein by reference in its entirety.

TECHNICAL FIELD

Embodiments of the disclosure relate generally to communication cables and, more particularly, to twisted pair communication cables incorporating separators positioned between at least two twisted pairs and configured to provide convective heat transfer that assists in cooling the cable.

BACKGROUND

A wide variety of different types of communication cables and composite cables incorporate twisted pair conductors. In a wide variety of applications, when a twisted pair cable is installed and utilized, relatively higher amounts of heat may be generated in certain portions of the cable. For example, with a cable installed in a data center, portions of the cable situated in relatively close proximity to electronic equipment and/or equipment cabinets (e.g., portions of the cable near terminating ends) may become hotter than other portions of the cable. Additionally, electronic equipment connected to or near the termination ends of the cable may generate heat. The heat may negatively impact both the electrical performance of the cable and the performance of electronic equipment associated with the cable. Accordingly, there is an opportunity for improved cables that provide for heat transfer that assists in cooling the cable and/or any associated electronic equipment.

Additionally, in twisted pair cables, signal performance may be degraded due to a wide variety of factors, including signal attenuation and crosstalk. Crosstalk typically occurs when a signal transmitted on one channel (e.g., a first twisted pair) creates an undesired effect in another channel (e.g., a second twisted pair). Crosstalk is usually caused by undesired capacitive, inductive, or conductive coupling from one channel to another. Accordingly, there is an opportunity for improved twisted pair cables that provide for heat transfer to facilitate cooling and that further include suitable shielding structures that enhance signal performance.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
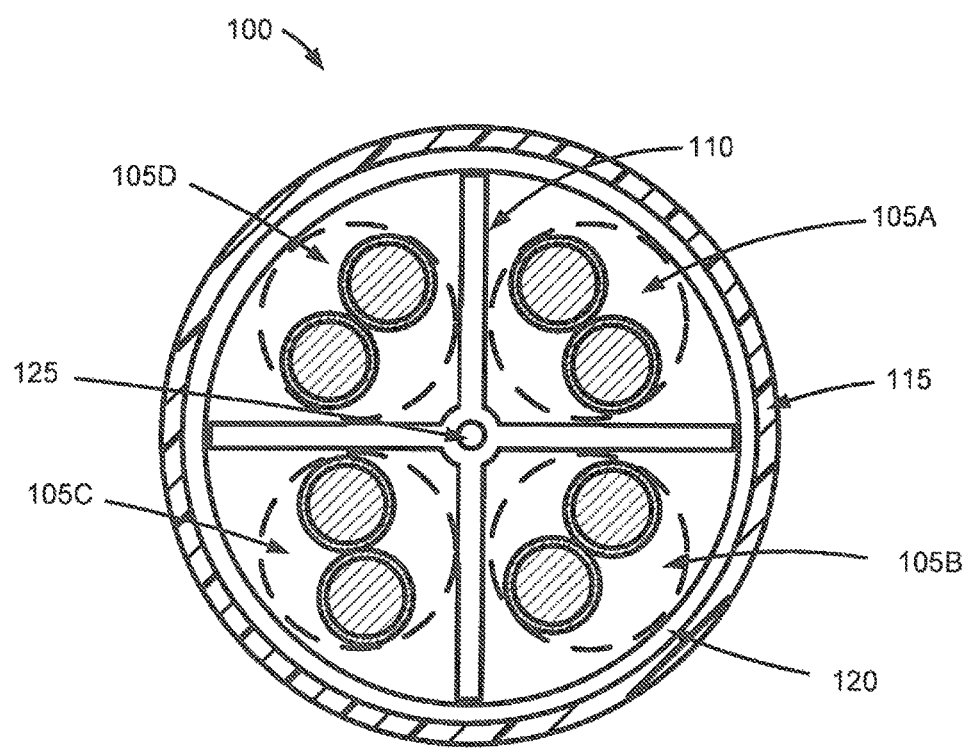
FIGS. 1-3 are cross-sectional views of example twisted pair cables that include separators or fillers that provide for convective heat transfer within the cables, according to illustrative embodiments of the disclosure.

Various embodiments of the present disclosure are directed to separators or fillers for use in cables, such as twisted pair communication cables and/or other composite or hybrid cables that incorporate twisted pairs. Other embodiments are directed to cables incorporating these separator components. An example cable may include a plurality of twisted pairs of conductors positioned or situated within a cable core or opening defined by a cable jacket. Additionally, a suitable separator or filler may be positioned between at least two of the twisted pairs. The separator may assist in maintaining the positioning of a portion or all of the twisted pairs. Additionally, the separator may be configured to facilitate convective heat transfer within the cable.

According to an aspect of the disclosure, the separator may include at least one longitudinally extending channel that defines a lengthwise cavity through the separator. In various embodiments, fluid may be positioned within the channel, such as air, other gas(es), one or more coolant(s), or other suitable fluids. The at least one longitudinally extending channel (also referred to as the longitudinal channel) may assist in convective heat transfer along a longitudinal length of the cable. As portions of cable heat up (e.g., portions of the cable positioned in proximity to electronic equipment, etc.), the fluid within the longitudinal channel may transfer heat from the relatively warmer or hotter portions along the longitudinal length of the cable. In certain embodiments, the convective heat transfer may occur based primarily on temperature fluctuations within the cable and/or the longitudinal channel. In other embodiments, heat sinks may be incorporated into the longitudinal channel and/or other components of the separator in order to improve the convective heat transfer. In yet other embodiments, one or more fans and/or circulation systems may be connected to the cable to improve heat transfer. Ultimately, the convective heat transfer may facilitate normalization of the temperature along the longitudinal length of the cable. As a result, the electrical performance of the cable and/or electronic equipment associated with the cable may be improved.

In certain embodiments, the separator may additionally include one or more second channels that extend from a longitudinal channel through the separator, for example, to an outer surface of the separator. These second channels may further facilitate convective heat transfer via the separator. For example, one or more second channels may facilitate transfer of heat from other areas of the cable core (e.g., areas in which one or more twisted pairs are positioned) to the longitudinal channel, and the longitudinal channel may then assist in normalizing the temperature of the cable along its longitudinal length. As discussed in greater detail below, any number of second channels may be utilized as desired. Additionally, a wide variety of configurations and/or arrangements of second channels may be utilized. For example, a plurality of second channels may be positioned at a plurality of respective points along the longitudinal length of the separator. Further, a second channel may extend through the separator at any desired angle (e.g., an angle perpendicular to the longitudinal channel, an acute angle relative to the direction of the longitudinal channel, etc.).

As desired in various embodiments, a separator may additionally provide electromagnetic shielding for one or more of the twisted pairs. A wide variety of different types of materials may be utilized to provide shielding, such as electrically conductive material, semi-conductive material, and/or dielectric shielding material. Additionally, shielding material may be incorporated into the separator at a wide variety of locations, for example, on one or more surfaces and/or embedded within the separator. In certain embodiments, the separator may even be formed from a material that provides shielding. In other embodiments, either continuous shielding material or a plurality of discontinuous patches of shielding material may be formed on one or more surfaces of the separator, such as an external surface of the separator, on a surface of a cavity defined by the longitudinal channel, and/or within one or more second channels. A wide variety of suitable configurations and/or patterns of electrically conductive material may be formed as desired in various embodiments.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Example Cable Constructions

With reference to FIG. 1, a cross-section of an example cable 100 that may be utilized in various embodiments is illustrated. The cable 100 is illustrated as a twisted pair communications cable; however, other types of cables may be utilized, such as composite or hybrid cables that include a combination of twisted pairs and other transmission media (e.g., optical fibers, etc.). Indeed, suitable cables may include any number of transmission media including but not limited to one or more twisted pairs, optical fibers, coaxial cables, and/or power conductors. Additionally, embodiments of the disclosure may be utilized in association with horizontal cables, vertical cables, flexible cables, equipment cords, cross-connect cords, plenum cables, riser cables, or any other appropriate cables.

As shown in FIG. 1, the cable 100 may include a plurality of twisted pairs, such as the illustrated four twisted pairs 105A, 105B, 105C, 105D. Additionally, in accordance with an aspect of the disclosure, a separator 110 or filler may be positioned between at least two of the twisted pairs. An outer jacket 115 may then be formed around the twisted pairs and the separator 110. In certain embodiments, one or more suitable shield layers, such as an external shield 120 may also be incorporated into the cable 100. Each of these components is described in greater detail below.

Although the cable 100 is illustrated as having four twisted pairs 105A, 105B, 105C, 105D, any other suitable number of pairs may be utilized. As desired, the twisted pairs 105A-D may be twisted or bundled together and/or suitable bindings may be wrapped around the twisted pairs 105A-D. In other embodiments, multiple grouping of twisted pairs may be incorporated into a cable. As desired, each grouping may be twisted, bundled, and/or bound together. Further, in certain embodiments, the multiple groupings may be twisted, bundled, or bound together.

Each twisted pair (referred to generally as twisted pair 105 or collectively as twisted pairs 105) may include two electrical conductors, each covered with suitable insulation. Each twisted pair 105 can carry data or some other form of information, for example in a range of about one to ten Giga bits per second ("Gbps") or another appropriate frequency, whether faster or slower. As desired, each of the twisted pairs may have the same twist lay length or alternatively, at least two of the twisted pairs may include a different twist lay length. For example, each twisted pair may have a different twist rate. The different twist lay lengths may function to reduce crosstalk between the twisted pairs. A wide variety of suitable twist lay length configurations may be utilized. In certain embodiments, the differences between twist rates of twisted pairs 105 that are circumferentially adjacent one another (for example the twisted pair 105A and the twisted pair 105B) may be greater than the differences between twist rates of twisted pairs 105 that are diagonal from one another (for example the twisted pair 105A and the twisted pair 105C). As a result of having similar twist rates, the twisted pairs that are diagonally disposed can be more susceptible to crosstalk issues than the twisted pairs 105 that are circumferentially adjacent; however, the distance between the diagonally disposed pairs may limit the crosstalk.

Additionally, in certain embodiments, each of the twisted pairs 105A-D may be twisted in the same direction (e.g., clockwise, counter clockwise). In other embodiments, at least two of the twisted pairs 105A-D may be twisted in opposite directions. Further, as desired in various embodiments, one or more of the twisted pairs 105A-D may be twisted in the same direction as an overall bunch lay of the combined twisted pairs. For example, the conductors of each of the twisted pairs 105A-D may be twisted together in a given direction. The plurality of twisted pairs 105A-D may then be twisted together in the same direction as each of the individual pair's conductors. In other embodiments, at least one of the twisted pairs 105A-D may have a pair twist direction that is opposite that of the overall bunch lay. In yet other embodiments, all of the twisted pairs 105A-D may have pair twist directions that are opposite that of the overall bunch lay.

The electrical conductors of a twisted pair 105 may be formed from any suitable electrically conductive material, such as copper, aluminum, silver, annealed copper, gold, a conductive alloy, etc. Additionally, the electrical conductors may have any suitable diameter, gauge, and/or other dimensions. Further, each of the electrical conductors may be formed as either a solid conductor or as a conductor that includes a plurality of conductive strands that are twisted together.

The twisted pair insulation may include any suitable dielectric materials and/or combination of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. Additionally, in certain embodiments, the insulation of each of the electrical conductors utilized in the twisted pairs 105A-D may be formed from similar materials. In other embodiments, at least two of the twisted pairs may utilize different insulation materials. For example, a first twisted pair may utilize an FEP insulation while a second twisted pair utilizes a non-FEP polymeric insulation. In yet other embodiments, the two conductors that make up a twisted pair may utilize different insulation materials.

In certain embodiments, the insulation may be formed from multiple layers of one or a plurality of suitable materials. In other embodiments, the insulation may be formed from one or more layers of foamed material. As desired, different foaming levels may be utilized for different twisted pairs in accordance with twist lay length to result in insulated twisted pairs having an equivalent or approximately equivalent overall diameter. In certain embodiments, the different foaming levels may also assist in balancing propagation delays between the twisted pairs. As desired, the insulation may additionally include other materials, such as a flame retardant materials, smoke suppressant materials, etc.

The jacket 115 may enclose the internal components of the cable 100, seal the cable 100 from the environment, and provide strength and structural support. The jacket 115 may be formed from a wide variety of suitable materials and/or combinations of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. The jacket 115 may be formed as a single layer or, alternatively, as multiple layers. In certain embodiments, the jacket 115 may be formed from one or more layers of foamed material. As desired, the jacket 115 can include flame retardant and/or smoke suppressant materials. Additionally, the jacket 115 may include a wide variety of suitable shapes and/or dimensions. For example, the jacket 115 may be formed to result in a round cable or a cable having an approximately circular cross-section; however, the jacket 115 and internal components may be formed to result in other desired shapes, such as an elliptical, oval, or rectangular shape. The jacket 115 may also have a wide variety of dimensions, such as any suitable or desirable outer diameter and/or any suitable or desirable wall thickness. In various embodiments, the jacket 115 can be characterized as an outer jacket, an outer sheath, a casing, a circumferential cover, or a shell.

An opening enclosed by the jacket 115 may be referred to as a cable core, and the twisted pairs 105 and the separator 110 may be disposed within the cable core. Although a single cable core is illustrated in FIG. 1, a cable may be formed to include multiple cable cores. In certain embodiments, a cable core may be filled with a gas such as air (as illustrated) or alternatively a gel, solid, powder, moisture absorbing material, water-swellable substance, dry filling compound, or foam material, for example in interstitial spaces between the twisted pairs 105. Other elements can be added to the cable core as desired, for example one or more optical fibers, additional electrical conductors, additional twisted pairs, water absorbing materials, and/or strength members, depending upon application goals.

The separator 110 or filler may be disposed within the cable core and configured to orient and or position one or more of the twisted pairs 105. The orientation of the twisted pairs 105 relative to one another may provide beneficial signal performance. Additionally, in accordance with an aspect of the disclosure, the separator 110 may include one or more longitudinally extending channels or longitudinal channels that facilitate convective heat transfer within the cable 100. As shown in FIG. 1, in certain embodiments, a single longitudinal channel 125 may be incorporated into the separator 110. As explained in greater detail below, other separator constructions may include a plurality of longitudinal channels.

As desired in various embodiments, the separator 110 may be formed in accordance with a wide variety of suitable dimensions, shapes, or designs. The separator 110 illustrated in FIG. 1 has an approximately cross-shaped cross-section. As other examples, a rod-shaped or circular separator, a flat separator, an X-shaped or cross-shaped separator, a T-shaped separator, a Y-shaped separator, a J-shaped separator, an L-shaped separator, a diamond-shaped separator, a separator having any number of spokes extending from a central point, a separator having walls or channels with varying thicknesses, a separator having T-shaped members extending from a central point or center member, a separator including any number of suitable fins, and/or a wide variety of other shapes may be utilized. A few example cross-sectional shapes that may be utilized for separators are described in greater detail below with reference to FIGS. 6A-6Q.

Additionally, in certain embodiments, a cross-sectional shape of the separator 100 may be expanded or modified relative to a conventional cross-sectional shape (e.g., an X-shape, etc.) in order to accommodate one or more longitudinal channels 125. For example, the separator 110 of FIG. 1 has a cross-sectional shape that is approximately an "X" or cross. A central portion of the separator 110 is expanded or modified in order to accommodate the longitudinal channel 125. In other words, one or more cross-sectional dimensions of the separator body may be expanded or otherwise modified based at least in part on the size and/or other dimensions of the longitudinal channel(s) 125. Indeed, any of the cross-sectional shaped discussed above, as well as a wide-variety of other shapes may be modified in order to accommodate one or more longitudinal channels. In other embodiments, one or more longitudinal channels may be formed without exaggerating or otherwise modifying a cross-sectional shape of the separator.

A wide variety of suitable methods or techniques may be utilized as desired in order to form a separator 110. In certain embodiments, material may be extruded through one or more dies and/or via any number of other suitable extrusion techniques in order to obtain a desired cross-sectional shape. In other embodiments, material may be cast or molded into a desired shape to form the separator 110. In yet other embodiments, a tape may be formed into a desired shape utilizing a wide variety of folding and/or shaping techniques. For example, a relatively flat tape may be formed into an X-shape or cross-shape as a result of being passed through one or more dies. Additionally, in certain embodiments, a separator 110 may be formed in a single pass (e.g., a single extrusion step). In other embodiments, a separator 110 may be formed via multi-step process. For example, a separator 110 may be formed with a plurality of layers. As another example, various components of the separator 110 (e.g., a central portion, fins or extensions, etc.) may be formed separately and then combined together. As desired, different manufacturing techniques may be utilized to form various components. For example, a central portion of the separator 110 may be extruded or molded, and then a tape may be folded around the central portion in order to form extensions or prongs.

At least one longitudinal channel 125 may extend along a longitudinal length of the separator 110, for example, from a first end of the separator 110 to a distal end of the separator 110. Additionally, in certain embodiments, a longitudinal channel 125 may extend through a body portion of the separator 110. In other words, the longitudinal channel 125 may define a cavity through the separator 110. Accordingly, the separator may have both one or more inner surfaces that define respective cavities or longitudinal channels and an outer surface that defines an outer periphery of the separator 110. The longitudinal channel 125 may facilitate convective heat transfer along a longitudinal length of the separator 110 and/or cable 100. For example, as heat is generated in the cable 100 (e.g., heat in a twisted pair 105, heat developed at a portion of the cable 100 situated near electronic equipment, etc.), the longitudinal channel 125 may facilitate transfer of the heat to other portions of the cable. In other words, the longitudinal channel 125 may promote temperature balancing within the cable, thereby cooling the relatively hotter portions of the cable. As a result of this convective heat transfer, the electrical performance of the cable 100 and/or electronic equipment associated with the cable 100 may be improved or enhanced.

A longitudinal channel 125 may be formed with a wide variety of suitable dimensions. As shown, the longitudinal channel 125 has an approximately circular cross-sectional shape. In other embodiments, a longitudinal channel may have an elliptical, square, rectangular, hexagonal, octagonal, or any other suitable cross-sectional shape. Additionally, the longitudinal channel 125 may have any suitable cross-sectional diameter and/or other dimensions (e.g., width, area, etc.) that define the size of the channel. In certain embodiments, the longitudinal channel 125 may have a diameter between approximately 0.5 mm and approximately 2.5 mm. For example, the longitudinal channel 125 may have a diameter of approximately 0.5 mm, 1.0 mm, 1.5 mm, 2.0 mm, 2.5 mm, a diameter incorporated in a range between any two of the above values, or a diameter incorporated in a range bounded on a minimum or maximum end by one of the above values. In other embodiments, the longitudinal channel 125 may have a width and/or length dimension between approximately 1.0 mm and approximately 4.8 mm. As other examples, a longitudinal channel 125 may have a width/length dimension of approximately 0.5 mm, 1.0 mm, 1.5 mm, 2.0 mm, 2.5 mm, 3.0 mm, 3.5 mm, 4.0 mm, 4.5 mm, 5.0 mm, a value incorporated in a range between any two of the above values, or a value incorporated in a range bounded on a minimum or maximum end by one of the above values. In yet other embodiments, the longitudinal channel 125 may have a cross-sectional area between approximately 0.2 $mm^2$ and approximately 5 $mm^2$. For example, the longitudinal channel 125 may have a cross-sectional area or approximately 0.2 $mm^2$, 0.5 $mm^2$, 0.7 $mm^2$, 1.0 $mm^2$, 1.5 $mm^2$, 2.0 $mm^2$, 2.5 $mm^2$, 3.0 $mm^2$, 3.5 $mm^2$, 4.0 $mm^2$, 4.5 $mm^2$, 5.0 $mm^2$, a value incorporated in a range between any two of the above values, or a value incorporated in a range bounded on a minimum or maximum end by one of the above values. Additionally, in certain embodiments, the longitudinal channel 125 (or the combination of a plurality of longitudinal channels) may be sized in order to achieve a desired convective heat transfer rate along the cable 100.

In certain embodiments, the longitudinal channel 125 may be filled with a suitable gas, such as air, nitrogen, helium, or a suitable mixture of gases. As desired, a gas or mixture of gases having a desired thermal conductivity, such as a thermal conductivity estimated using the Chapman-Enskog model, may be selected. In other embodiments, the longitudinal channel 125 may be filled with a suitable refrigerant or cooling liquid, such as water, glycols, one or more dielectric fluids, etc. Additionally, in certain embodiments, a substance (e.g., air, etc.) may be permitted to freely migrate within the channel. In other embodiments, the cable 100 may be connected to one or more suitable circulation systems that facilitate flow of a cooling substance through the cable. For example, one or more fans may be positioned at an end of the cable 100 to facilitate gas flow through the longitudinal channel 125. As another example, one or more suitable pumping systems, compressors, refrigeration systems, etc. may facilitate the flow of cooling gas and/or liquid through the longitudinal channel 125. Additionally, as discussed in greater detail below, a plurality of longitudinal channels may be incorporated into a separator 110. In certain embodiments, one or more fluid diverting end caps and/or other suitable components may be utilized to facilitate the recirculation of fluids (e.g., gases, liquids, etc.) through two or more longitudinal channels.

A wide variety of suitable methods or techniques may be utilized to form a longitudinal channel 125 as desired. In certain embodiments, the separator 110 may be extruded in a manner that facilitates the formation of one or more longitudinal channels. For example, an extrusion die utilized to form the separator 110 may also facilitate the formation of one or more longitudinal channels. As another example, a tape utilized to form the separator 110 may be folded such that one or more longitudinal channels are formed.

In certain embodiments, the separator may additionally include one or more second channels that extend from a longitudinal channel 125 through the separator 110. For example, one or more second channels may extend from the cavity defined by the longitudinal channel 125 through a body of the separator 110 to an outer surface of the separator 110. These second channels may further facilitate convective heat transfer via the separator 110. For example, one or more second channels may facilitate transfer of heat from other areas of the cable core (e.g., areas in which one or more twisted pairs 105 are positioned) to the longitudinal channel 125, and the longitudinal channel 125 may then assist in normalizing the temperature of the cable 100 along its longitudinal length.

A second channel may be formed with a wide variety of suitable dimensions. As desired in various embodiments, a second channel may have an approximately circular, elliptical, square, rectangular, hexagonal, octagonal, or any other suitable cross-sectional shape. Additionally, the second channel may have any suitable cross-sectional diameter and/or other dimensions (e.g., width, area, etc.) that define the size of the channel. In certain embodiments, a second channel may have a diameter, cross-sectional area, or other dimension similar to those described above for the longitudinal channel 125. For example, the second channel may have a cross-sectional area or approximately 0.2 $mm^2$, 0.5 mm², 0.7 mm², 1.0 mm², 1.5 mm², 2.0 mm², 2.5 mm², 3.0 mm², 3.5 mm², 4.0 mm², 4.5 mm², 5.0 mm², a value incorporated in a range between any two of the above values, or a value incorporated in a range bounded on a minimum or maximum end by one of the above values. Additionally, in certain embodiments, the second channel may be sized in order to achieve a desired convective heat transfer rate between the cable core and the longitudinal channel 125.

As desired in various embodiments, any number of second channels may be incorporated into the separator 110. Additionally, a wide variety of configurations and/or arrangements of second channels may be utilized. In certain embodiments, one or more second channels may be positioned at a plurality of respective points along the longitudinal length of the separator. For example, second channels may be spaced along the separator 110 in a pattern or with a repeating step. A wide variety of suitable spacings or distances may be present between second channels, such as spacings of approximately 0.05 meters, 0.1 meters, 0.25 meters, 0.5 meters, 1.0 meters, 1.5 meters, 2.0 meters, 2.5 meters, 3.0 meters, 4.0 meters, 5.0 meters, a spacing included in a range between any two of the above values, and/or a spacing that is included in a range bounded on either a minimum or maximum end by one of the above values. In other embodiments, second channels may be positioned along the separator in accordance with a random or pseudo-random pattern.

Additionally, in certain embodiments, a single second channel may be formed at each respective cross-sectional location along a longitudinal length of the separator 110. In other embodiments, a plurality of second channels may be formed at one or more locations at which second channels are positioned. For example, a first one of the second channels may open at a first point along an outer periphery of the separator 110 (e.g., a location proximate to a first twisted pair) while a second one of the second channels may open at a second point along an outer periphery of the separator 110 (e.g., a location proximate to a second twisted pair). Any number of second channels may be formed at a given location. For example, a second channel may be formed that corresponds to each of the twisted pairs 105. As another example, a second channel may be formed that corresponds to each prong of the separator 110.

In other embodiments, one or more second channels having a first orientation may be formed at a first longitudinal position along the separator 110 while one or more additional second channels having a second orientation may be formed at a second longitudinal position along the separator 110. For example, at a first position, a second channel may be formed that opens at a location proximate to a first twisted pair and, at a second position, an additional second channel may be formed that opens at a location proximate to a second twisted pair. As another example, second channels may be formed diagonally through the separator 110, and the direction of the formation may be altered such that a first one of the second channels opens proximate to a first and third twisted pair 105A, 105C while a second one of the second channels opens proximate to a second and fourth twisted pair 105B, 105D. A wide variety of other suitable configurations may be utilized as desired, and those discussed herein are provided by way of example only.

Further, a second channel may extend through the separator at any desired angle. In certain embodiments, a second channel may be formed such that it is perpendicular to the longitudinal channel 125. In other embodiments, a second channel may be formed such that it opens into the longitudinal channel 125 at an acute angle. A wide variety of suitable acute angles may be utilized as desired, such as an approximately 25°, 30°, 35°, 45°, 50°, 55°, 60°, 65°, 70°, 75°, 80°, 85°, any angle included in a range between any two of the above values, and/or an angle that is included in a range bounded on either a minimum or maximum end by one of the above values. In certain embodiments, each of the second channels may be formed at approximately equal angles with respect to the longitudinal channel 125. In other embodiments, at least two of the second channels may be formed at varying or different angles with respect to the longitudinal channel 125.

A wide variety of suitable methods or techniques may be utilized to form one or more second channels as desired in various embodiments. In certain embodiments, after the separator 110 is formed (e.g., extruded, etc.), one or more suitable punching, cutting, and/or drilling devices may be utilized to form second channels in the separator 110. Each device may form respective second channels at a plurality of locations along the separator 110 as the separator 110 is fed past and/or through the device. In certain embodiments, the separator 125 may be extruded or otherwise formed, and second channels may then be formed in a relatively continuous or on-line process. In other embodiments, formation of the separator 125 and the second channels may occur in an off-line manner.

As desired in various embodiments, electromagnetic shielding material may be incorporated into the separator 110. A wide variety of different types of materials may be utilized to provide shielding, such as electrically conductive material, semi-conductive material, and/or dielectric shielding material. A few examples of suitable materials are described in greater detail below. Additionally, as desired in various embodiments, shielding material may be incorporated into the separator 110 at a wide variety of locations. In certain embodiments, shielding material may be formed on one or more surfaces of the separator 110. For example, shielding material may be formed on an internal surface of the separator 110 body within the longitudinal channel 125. As another example, shielding material may be formed on an external surface of the separator 110. As yet another example, shielding material may be formed on a plurality of surfaces of the separator 110, such as on an internal surface and on an external surface. In other embodiments, shielding material may be embedded within the body of the separator 110. For example, particles of shielding material may be blended into or otherwise incorporated into the body of the separator 110. As another example, a layer of shielding material may be positioned between layers of a separator body, such as two dielectric layers. In yet other embodiments, a separator 110 may be extruded, molded, or otherwise formed from a one or more suitable shielding materials. For example, a separator 110 may be formed from one or more conductive, semi-conductive, and/or dielectric shielding materials. In yet other embodiments, a separator 110 may include a plurality of different types of shielding materials. For example, a separator 110 may be extruded from a dielectric shielding material and one or more layers of electrically conductive material may be formed on the separator 110. A wide variety of other suitable separator constructions that incorporate shielding material may also be utilized.

In certain embodiments, the separator 110 may include shielding material that is continuous along the longitudinal length of the separator 110. For example, a relatively continuous layer of shielding material may be formed on a separator surface. As another example, the separator 110 may be formed from one or more shielding materials. In other embodiments, the separator 110 may include discontinuous shielding material. With discontinuous shielding material, shielding material may be spaced throughout the separator 110 or within a layer of the separator 110 (e.g., a layer formed on a surface) and gaps or spaces may be present between adjacent shielding material components. In certain embodiments, one or more discontinuous patches of shielding material may be formed. For example, discontinuous patches of shielding material may be formed on one or more separator surfaces. As described in greater detail below, a wide variety of suitable configurations and/or patterns of shielding material may be formed as desired in various embodiments.

As desired in various embodiments, one or more heat sinks may also be incorporated into the separator 110. A heat sink may operate to absorb and/or transfer thermal energy or heat away from the twisted pairs 105 and/or electronic equipment associated with the cable 100. In certain embodiments, a heat sink may transfer heat to the longitudinal channel 125 such that the heat may be removed and/or dissipated. A wide variety of different types of heat sinks may be incorporated into the separator 110. Examples of suitable heat sinks include heat sinks formed from aluminum, aluminum alloys, copper, copper alloys, other metallic materials, diamond, one or more composite materials, etc. Additionally, a heat sink may be positioned at a wide variety of locations within a separator 110. In certain embodiments, a heat sink may be positioned within a longitudinal channel 125 or within a second channel. In other embodiments, a heat sink may extend partially or completely through the separator body, for example, from the longitudinal channel 125 through the separator body to an external surface. In yet other embodiments, one or more heat sinks may be utilized to form or partially form one or more respective fins. For example, the prongs or extensions of a separator (i.e., the extensions of the cross-shaped or X-shaped separator 110 illustrated in FIG. 1) may be formed or partially formed from heat sinks. As another example, heat sinks may be utilized to form fins in addition to the prongs or extensions of the separator 110, such as fins extending from an external surface of the separator 110, fins extending into the longitudinal channel 125, and/or fins extending through the separator body.

A heat sink may be formed with a wide variety of suitable dimensions as desired in various embodiments. For example, a heat sink may have a wide variety of suitable shapes (e.g., rectangular, trapezoidal, etc.) and/or sizes. Additionally, a plurality of heat sinks may be arranged into any suitable configuration, such as a pin fin configuration, a straight fin configuration, or a flared fin configuration. Further, as desired in various embodiments, heat sinks may be positioned at a wide variety of suitable locations along a longitudinal length of the separator 110. In certain embodiments, respective heat sinks or sets of heat sinks may be positioned at spaced locations along a longitudinal length of the separator 110. A wide variety of suitable longitudinal spaces may be present between heat sinks, such as spaces of approximately 0.1 meters, 0.25 meters, 0.5 meters, 1.0 meters, 2.0 meters, 3.0 meters, 5.0 meters, a spacing included in a range between any two of the above values, or a spacing included in a range bounded on either a minimum or maximum end by one of the above values. In other embodiments, a heat sink may be relatively continuous along a longitudinal length of the separator 110. For example, a fin may extend along a length of the separator 110.

In certain embodiments, a separator 110 may be formed from a single segment or portion. In other words, the separator 110 may be formed as a relatively continuous separator along a longitudinal length of the cable 100. In other embodiments, a separator 110 may be formed from a plurality of discrete or severed segments or portions. For example, discrete segments or portions may be positioned adjacent to one another along a longitudinal length of the separator 110. In certain embodiments, gaps or spaces may be present between various segments or portions of the separator 110. In other embodiments, at least a portion of the segments may be arranged in an overlapping configuration.

The separator 110 may have a body formed from a wide variety of suitable materials as desired in various embodiments. For example, the dielectric base of the separator 110 and/or various separator segments can include paper, metals, alloys, various plastics, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, one or more dielectric shielding materials (e.g., barium ferrite, etc.) or any other suitable material or combination of materials. In certain embodiments, the separator 110 may have a relatively flexible body. As desired, the separator 110 may be filled, unfilled, foamed, un-foamed, homogeneous, or inhomogeneous and may or may not include additives (e.g., flame retardant and/or smoke suppressant materials).

As desired, a wide variety of suitable techniques and/or processes may be utilized to form the separator 110 or various segments or components of the separator 110. For example, a base material or dielectric material may be extruded, poltruded, or otherwise formed. In certain embodiments, electrically conductive material or other shielding material may be applied to the base material, inserted into the base material, or embedded in the base material. In other embodiments, dielectric material may be formed around shielding material. As desired, the base layer may have a substantially uniform composition, may be made of a wide range of materials, and/or may be fabricated in a single manufacturing pass. Further, the base layer may be foamed, may be a composite, and may include one or more strength members, fibers, threads, or yarns. Additionally, the base layer may be hollow and/or include any number of longitudinal channels 125 as described above. In other embodiments, the separator 110 or certain components of the separator 110 may be formed from a tape that includes one or more dielectric layers (e.g., plastic, polyester, polyethylene, polypropylene, fluorinated ethylene propylene, polytetrafluoroethylene, polyimide, or some other polymer or dielectric material that does not ordinarily conduct electricity etc.) and, if desired, one or more electrically conductive layers (e.g., copper, aluminum, an alloy, etc.) or shielding layers. A tape utilized in a separator may be formed in a similar manner as the tape shield layer described below.

For a segmented separator formed from a plurality of discrete segments, the various portions or segments of the separator 110 may include a wide variety of different lengths and/or sizes. For example, a portion of the separator 110 may be approximately six inches, one foot, two feet, or any other suitable length. As another example, a portion of the separator 110 may be approximately half a meter, one meter, two meters, or three meters. In certain embodiments, portions of the separator 110 may be approximately three meters or less. In certain embodiments, portions having a common length may be incorporated into the cable 100. In other embodiments, portions of the separator 110 may have varying lengths. These varying lengths may follow an established pattern or, alternatively, may be incorporated into the cable at random. Additionally, in certain embodiments, each segment or portion of the separator 110 may be formed from similar materials. In other embodiments, a separator 110 may make use of alternating materials in adjacent portions (whether or not a gap is formed between adjacent portions). For example, a first portion or segment of the separator 110 may be formed from a first set of one or more materials, and a second portion or segment of the separator 110 may be formed from a second set of one or more materials. As one example, a relatively flexible material may be utilized in every other portion of a separator 110. As another example, relatively expensive flame retardant material may be selectively incorporated into desired portions of a separator 110. In this regard, material costs may be reduced while still providing adequate flame retardant qualities.

Figure 2:
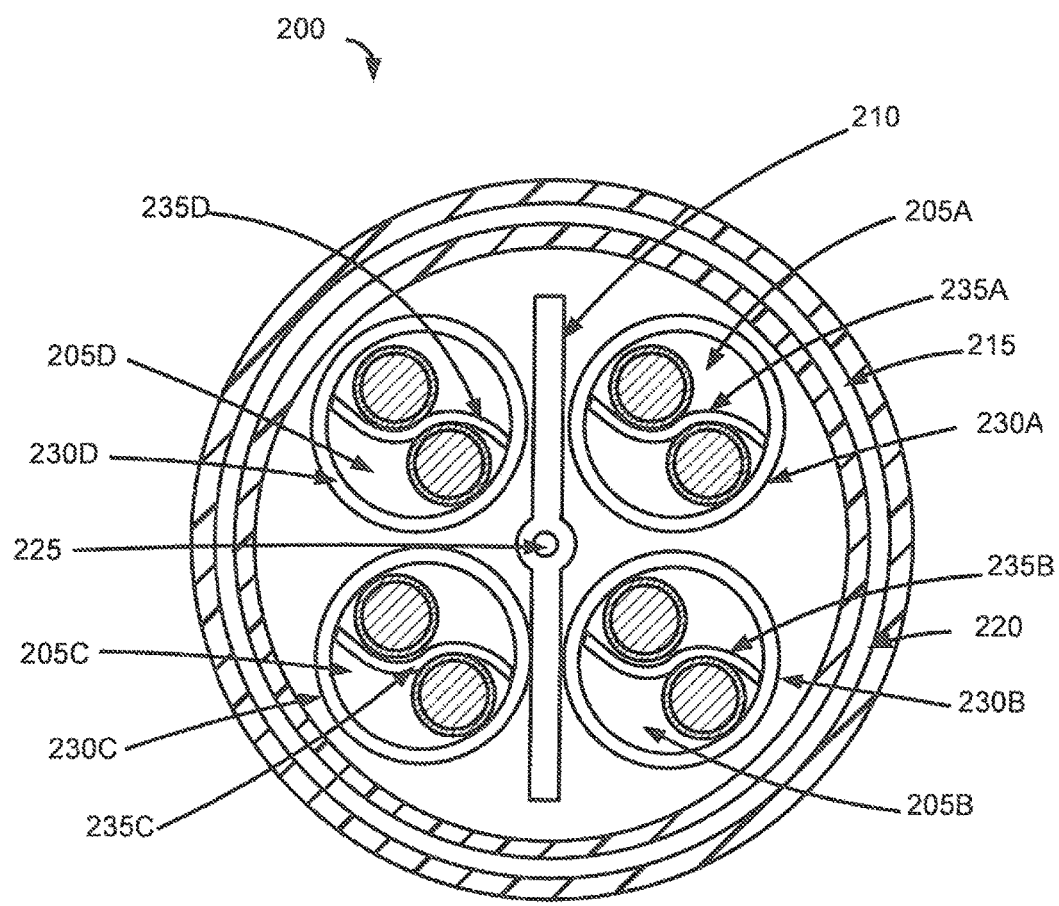
Figure 3:
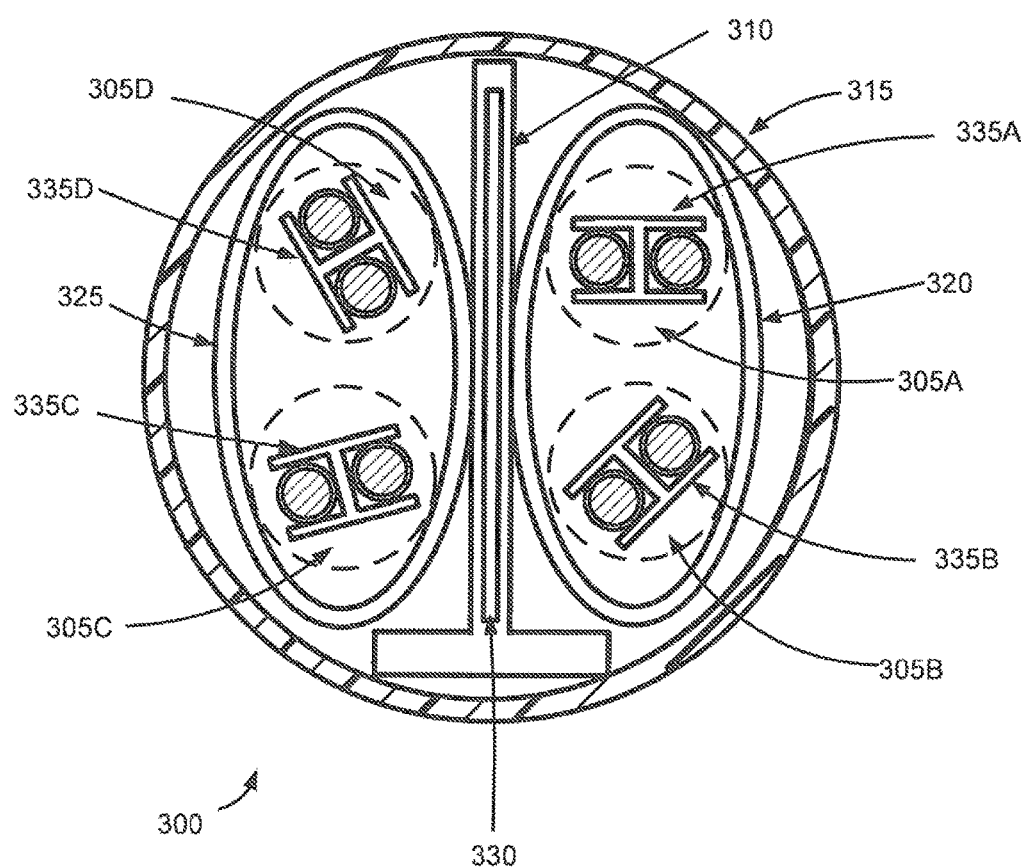

With continued reference to the cable 100 of FIG. 1, in certain embodiments, one or more shield layers can be disposed between the jacket 115 and one or more additional cable components. For example, as shown in FIG. 1, an external shield 120 or an overall shield may be disposed between the jacket 115 and the twisted pairs 105. In other words, the external shield may be wrapped around and/or encompass the collective group of twisted pairs. In certain embodiments, the shield 120 may be positioned between the twisted pairs 105 and the outer jacket 115. In other embodiments, the shield 120 may be embedded into the outer jacket 115, incorporated into the outer jacket 115, or even positioned outside of the outer jacket 115. As another example, as illustrated in FIG. 2, individual shields may be provided for each of the twisted pairs. As yet another example, as illustrated in FIG. 3, shield layers may be provided for any desired groupings of twisted pairs. As desired, multiple shield layers may be provided, for example, individual shields and an overall shield. One or more shield layers may incorporate electrically conductive material, semi-conductive material, or dielectric shielding material in order to provide electrical shielding for one or more cable components. Further, in certain embodiments, the cable 100 may include a separate, armor layer (e.g., a corrugated armor, etc.) for providing mechanical protection.

Various embodiments of the external shield 120 illustrated in FIG. 1 are generally described herein; however, it will be appreciated that other shield layers may have similar constructions. In certain embodiments, a shield 120 may be formed from a single segment or portion that extends along a longitudinal length of the cable 100. In other embodiments, a shield 120 may be formed from a plurality of discrete segments or portions positioned adjacent to one another along a longitudinal length of the cable 100. In the event that discrete segments or portions are utilized, in certain embodiments, gaps or spaces may exist between adjacent segments or portions. In other embodiments, certain segments may overlap one another. For example, an overlap may be formed between segments positioned adjacent to one another along a longitudinal length of the cable.

As desired, a wide variety of suitable techniques and/or processes may be utilized to form a shield 120 (or a shield segment). As one example, a base material or dielectric material may be extruded, poltruded, or otherwise formed. Electrically conductive material or other shielding material may then be applied to the base material. In other embodiments, shielding material may be injected into the base material or the shield may be formed primarily from a shielding material (e.g., a dielectric shielding material). In other embodiments, dielectric material may be formed or extruded over electrically conductive material in order to form a shield 120. Indeed, a wide variety of suitable techniques may be utilized to incorporate shielding material into a shield 120. In certain embodiments, the base layer may have a substantially uniform composition and/or may be made of a wide range of materials. Additionally, the base layer may be fabricated in any number of manufacturing passes, such as a single manufacturing pass. Further, the base layer may be foamed, may be a composite, and/or may include one or more strength members, fibers, threads, or yarns. As desired, flame retardant material, smoke suppressants, and/or other desired substances may be blended or incorporated into the base layer.

In certain embodiments, the shield 120 (or individual shield segments) may be formed as a tape that includes both dielectric layers and a shielding layer (e.g., copper, aluminum, silver, an alloy, etc.) formed on one or both sides of the dielectric layer. Examples of suitable materials that may be used to form a dielectric layer include, but are not limited to, various plastics, one or more polymeric materials, one or more polyolefins (e.g., polyethylene, polypropylene, etc.), one or more fluoropolymers (e.g., fluorinated ethylene propylene ("FEP"), polyester, polytetrafluoroethylene, polyimide, or some other polymer, combination of polymers, or dielectric material(s) that does not ordinarily conduct electricity. Shielding material may then be deposited on, adhered to, or otherwise formed on the dielectric layer. Additionally, in certain embodiments, an electrically conductive layer may be sandwiched between two dielectric layers. In other embodiments, at least two electrically conductive layers may be combined with any number of suitable dielectric layers to form the shield 120. For example, a four layer construction may include respective electrically conductive layers formed on either side of a first dielectric layer. A second dielectric layer may then be formed on one of the electrically conductive layers to provide insulation between the electrically conductive layer and the twisted pairs 105. Indeed, any number of suitable layers of material may be utilized to form a tape which may be used as the shield 120.

As set forth above, either a separator 110, a shield (e.g., an overall shield 120), or any other suitable component may provide shielding for a cable 100. Any of these components may be generally referred to as a shield element. Additionally, as previously mentioned, shielding material may be incorporated into a shield element utilizing a wide variety of suitable techniques and/or configurations. For example, a shield element may be formed (e.g., extruded, molded, etc.) from a shielding material. As another example, shielding material may be embedded into a shield element. As yet another example, shielding material may be formed on a base layer or a dielectric layer. In certain embodiments, a separate base dielectric layer and shielding layer may be bonded, adhered, or otherwise joined (e.g., glued, etc.) together to form a shield element. In other embodiments, shielding material may be formed on a dielectric layer via any number of suitable techniques, such as the application of metallic ink or paint, liquid metal deposition, vapor deposition, welding, heat fusion, adherence of patches to the dielectric, or etching of patches from a metallic sheet. In certain embodiments, the patches of shielding material can be over-coated with an electrically insulating film, such as a polyester coating.

In certain embodiments, a shield element may be a relatively continuous shield element that includes shielding material that extends substantially along a longitudinal length of the shield element. For example, a relatively continuous metallic material, a braided shielding material, or a foil shield may be utilized. In other embodiments, a shield element may be formed as a discontinuous shield element having a plurality of isolated patches of shielding material. For non-segmented or continuous shield elements, a plurality of patches of shielding material may be incorporated into the shield element, and gaps or spaces may be present between adjacent patches in a longitudinal direction. For segmented shield elements, in certain embodiments, each segment or section of the shield element may include either a single patch of shielding material. In other embodiments, a segment of a shield element may include a plurality of electrically conductive patches, and gaps or spaces may be present between adjacent patches. For example, a plurality of discontinuous patches may be formed on one or more surfaces with gaps between adjacent patches. A wide variety of different patch patterns may be formed as desired in various embodiments, and a patch pattern may include a period or definite step. In other embodiments, patches may be formed in a random or pseudo-random manner. Additionally, for discontinuous shields, individual patches may be separated from one another so that each patch is electrically isolated from the other patches. That is, the respective physical separations between the patches may impede the flow of electricity between adjacent patches. In certain embodiments, the physical separation of other patches may be formed by gaps or spaces, such as gaps of dielectric material or air gaps.

A wide variety of suitable materials and/or combination of materials may be utilized to form shielding layers and/or patches of shielding material. In certain embodiments, one or more electrically conductive materials may be utilized including, but not limited to, metallic material (e.g., silver, copper, nickel, steel, iron, annealed copper, gold, aluminum, etc.), metallic alloys, conductive composite materials, etc. Indeed, suitable electrically conductive materials may include any material having an electrical resistivity of less than approximately $1 \times 10^{-7}$ ohm meters at approximately 20° C. In certain embodiments, an electrically conductive material may have an electrical resistivity of less than approximately $3 \times 10^{-8}$ ohm meters at approximately 20° C. In other embodiments, one or more semi-conductive materials may be utilized including, but not limited to, silicon, germanium, other elemental semiconductors, compound semiconductors, materials embedded with conductive particles, etc. In yet other embodiments, one or more dielectric shielding materials may be utilized including, but not limited to, barium ferrite, etc.

The components of a shield element or various segments of a shield element may include a wide variety of suitable dimensions, for example, any suitable lengths in the longitudinal direction and/or any suitable thicknesses. A dielectric portion included in a shield element or segment. For example, the body portion of a separator may have a thickness of about 0.4 to about 4.0 mils (thousandths of an inch) or about 10 to about 100 microns. As another example, the dielectric or base portion of a shield layer may have a thickness of about 1 to about 5 mils (thousandths of an inch) or about 25 to about 125 microns. Additionally, each patch of shielding material may have any desired thickness, such as a thickness of about 0.5 mils (about 13 microns) or greater. In many applications, signal performance benefits from a thickness that is greater than about 2 mils, for example in a range of about 2.0 to about 2.5 mils, about 2.0 to about 2.25 mils, about 2.25 to about 2.5 mils, about 2.5 to about 3.0 mils, or about 2.0 to about 3.0 mils. Indeed, with a thickness of less than about 1.5 mils, negative insertion loss characteristics may be present on the cable 100.

In certain embodiments, a patch of shielding may cover substantially an entire area of a shield element or shield element segment. In other embodiments, a plurality of patches may be formed on a segment and/or a relatively continuous shield element. A wide variety of segment and/or patch lengths (e.g., lengths along a longitudinal direction of the cable 100) may be utilized. As desired, the dimensions of the segments and/or patches can be selected to provide electromagnetic shielding over a specific band of electromagnetic frequencies or above or below a designated frequency threshold. In certain embodiments, each segment and/or patch may have a length of about one meter to about one hundred meters, although lengths of less than one meter (e.g., lengths of about 1.5 to about 2 inches, etc.) may be utilized. For example, the segments and/or patches may have a length in a range of about one to ten meters. In various embodiments, the segments and/or patches can have a length of about 0.5, 0.75, 1.0, 1.5, 2.0, 2.5, 3.0, 3.5, 4.0, 4.5, or 5.0 meters or in a range between any two of these values;

In the event that a plurality of patches is formed on a relatively continuous shield element or a shield element segment, a wide variety of suitable gap distances or isolation gaps may be provided between adjacent patches. For example, the isolation spaces can have a length of about 0.5, 1.0, 1.5, 2.0, 2.5, 3.0, 3.5, or 4 millimeters or in a range between any two of these values. In one example embodiment, each patch may be at least two meters in length, and a relatively small isolation gap (e.g., 4 millimeters or less, about ¹⁄₁₆ of an inch, etc.) may be formed between adjacent patches. As explained in greater detail below with reference to FIG. 7F, in certain embodiments, a plurality of microcuts may be utilized to form a gap between two patches. Additionally, as desired, the patches may be formed as first patches (e.g., first patches on a first side of a dielectric material or body portion, on an outer surface), and second patches may be formed on an opposite side of the shield element (e.g., on an opposite side of a dielectric material or body portion, within a longitudinal channel, etc.). For example, second patches may be formed to correspond with the gaps or isolation spaces between the first patches. As desired, the patches may have a wide variety of different shapes and/or orientations. For example, the patches may have a rectangular, trapezoidal, or parallelogram shape. A few example shapes for patches are described in greater detail below with reference to FIGS. 7A-7G.

In certain embodiments, shield element segments and/or patches may be formed to be approximately perpendicular (e.g., square or rectangular segments and/or patches) to the longitudinal axis of the adjacent one or more pairs 105 (e.g., pairs enclosed by a shield, pairs adjacent to a separator, etc.). In other embodiments, the segments and/or patches may have a spiral direction that is opposite the twist direction of the enclosed one or more pairs 105. That is, if the twisted pair(s) 105 are twisted in a clockwise direction, then the segments and/or patches may spiral in a counterclockwise direction. If the twisted pair(s) 105 are twisted in a counterclockwise direction, then the conductive patches may spiral in a clockwise direction. Thus, twisted pair lay opposes the direction of the segment and/or patch spiral. The opposite directions may provide an enhanced level of shielding performance. In other embodiments, the segments and/or patches may have a spiral direction that is the same as the twist direction of the enclosed one or more pairs 105.

According to an aspect of the disclosure, one or more techniques may be utilized to reduce and/or eliminate electrical perturbations between shielding patches and/or at the circumferential edges of a shield element. As desired, these techniques may be applied to shield layers (e.g., the external shield 120, etc.) and/or to separators 110. As one example technique, in certain embodiments, at least one patch included in a shield element may be electrically shorted to itself or electrically continuous along a circumferential direction of the shield element. As another example technique, a shield element may be formed with overlapping segments in order to effectively eliminate longitudinal spaces or gaps between adjacent patches formed on the shield element. Each of these techniques are described in greater detail below.

In certain embodiments, at least one patch included in a shield element may be electrically shorted or continuous along a circumferential direction. For example, when a shield 120 (or a plurality of shield segments) is wrapped around one or more twisted pairs 105A-D, a patch may contact itself at or near the edges of the shield 120. As another example, when a separator 110 is formed from a tape, a patch may contact itself at or near the edges of the tape 110. As yet another example, a patch may be formed on a separator 110 such that the patch extends around the circumference of the separator 110 and contacts itself. In any of these examples, the patch may be electrically shorted to itself, thereby creating a continuous patch in a circumferential direction or along a periphery of the shield element. When the shield element is formed to include a plurality of patches that are discontinuous in a longitudinal direction and one or more patches are electrically shorted in a circumferential direction, electrical perturbations caused by the shield element may be reduced relative to conventional cables. Therefore, the cable 100 may exhibit improved electrical performance, such as reduced return loss and/or reduced cross-talk loss.

In certain embodiments, at least one shield element may be formed to include overlapping segments. For example, a shield element may be formed to include a plurality of electrically conductive patches arranged in a discontinuous manner; however, in contrast to certain conventional shield elements, the shield element may not include spaces or gaps between certain patches along its longitudinal direction. The shield element may include a plurality of discrete overlapping segments or sections along a longitudinal length of the cable, and each segment may include at least one patch of shielding material. The combination of the segments may form a discontinuous shield element; however, the overlapping nature of the segments may eliminate gaps between certain patches along a longitudinal direction. Thus, the discontinuous shield element may exhibit improved electrical performance relative to conventional discontinuous shields.

As desired in various embodiments, a wide variety of other materials may be incorporated into the cable 100. For example, as set forth above, the cable 100 may include any number of conductors, twisted pairs, optical fibers, and/or other transmission media. As another example, as illustrated in FIGS. 2 and 3, one or more respective dielectric films or other suitable components may be positioned between the individual conductors of one or more of the twisted pairs 105. In certain embodiments, one or more tubes or other structures may be situated around various transmission media and/or groups of transmission media. Additionally, as desired, a cable may include a wide variety of strength members, swellable materials (e.g., aramid yarns, blown swellable fibers, etc.), insulating materials, dielectric materials, flame retardants, flame suppressants or extinguishants, gels, and/or other materials. The cable 100 illustrated in FIG. 1 is provided by way of example only. Embodiments of the disclosure contemplate a wide variety of other cables and cable constructions. These other cables may include more or less components than the cable 100 illustrated in FIG. 1. Additionally, certain components may have different dimensions and/or materials than the components illustrated in FIG. 1.

FIG. 2 is a cross-sectional view of another example cable 200 that may include a separator that provides for convective heat transfer, according to an illustrative embodiment of the disclosure. The cable 200 of FIG. 2 may include components that are similar to the cable 100 illustrated and described above with reference to FIG. 1. Accordingly, the cable 200 may include a plurality of twisted pairs 205A-D disposed in a cable core. A separator 210 may be disposed between at least two of the twisted pairs 205A-D and may function to orient and/or provide desired spacing between two or more of the twisted pairs 205A-D.

With continued reference to FIG. 2, an outer jacket 215 may enclose the internal components of the cable 200. Additionally, a shield layer 220 may optionally be incorporated into the outer jacket 215. In certain embodiments, the shield layer 220 may be sandwiched between two other layers of outer jacket material, such as two dielectric layers. The layers of jacket material that sandwich the shield layer 220 may be formed of similar materials or, alternatively, of different materials. Further, a wide variety of suitable techniques may be utilized to bond or adhere the shield layer 220 to the other layers of the jacket 215. In other embodiments, electrically conductive material may be injected or inserted into the outer jacket 215. In yet other embodiments, the outer jacket 215 may be impregnated with electrically conductive material. In yet other embodiments, the cable 200 may not include an outer shield layer 220.

The separator 210 illustrated in FIG. 2 has a different cross-sectional shape than the separator 110 of FIG. 1. More specifically, the separator 210 is formed as a relatively flat separator 210. In certain embodiments, the separator 210 may approximately bisect the cable core such that two pairs are positioned on either side of the separator 210. Additionally, in accordance with an aspect of the disclosure, the separator 210 may include one or more longitudinal channels 225 that facilitate convective heat transfer. As desired, the separator 210 may additionally include one or more second channels. In certain embodiments, shielding material may also be incorporated into the separator 210 in a similar manner as that described above with reference to FIG. 1.

Additionally, as desired in certain embodiments, each of the twisted pairs 205A-D may be individually shielded. For example, shield layers 230A-D may respectively be wrapped or otherwise formed around each of the twisted pairs 205A-D. In other words, a first shield layer 230A may be formed around a first twisted pair 205A, a second shield layer 230B may be formed around a second twisted pair 205B, a third shield layer 230C may be formed around a third twisted pair 205C, and a fourth shield layer 230D may be formed around a fourth twisted pair 205D. In other embodiments, a portion or none of the twisted pairs may be individually shielded. Indeed, a wide variety of different shielding arrangements may be utilized in accordance with various embodiments of the disclosure.

With continued reference to FIG. 2, in certain embodiments, respective dielectric separators 235A-D may be woven helically between the individual conductors or conductive elements of one or more of the twisted pairs 205A-D. In other words, a dielectric separator (generally referred to as dielectric separator 235) may be helically twisted with the conductors of a twisted pair 205 along a longitudinal length of the cable 200. In certain embodiments, the dielectric separator 235 may maintain spacing between the individual conductors of the twisted pair 205 and/or maintain the positions of one or both of the individual conductors. For example, the dielectric separator 235 may be formed with a cross-section (e.g., an X-shaped cross-section, an H-shaped cross-section, etc.) that assists in maintaining the position(s) of one or both the individual conductors of the twisted pair 205. In other words, the dielectric separator 235 may reduce or limit the ability of one or both of the individual conductors to shift, slide, or otherwise move in the event that certain forces, such as compressive forces, are exerted on the cable 200. As illustrated in FIG. 2, in other embodiments, a dielectric separator 235 may be formed as a relatively simple film layer that is positioned between the individual conductors of a twisted pair 205.

FIG. 3 is a cross-sectional view of another example cable 300 including a separator with at least one longitudinal channel that facilitates convective heat transfer, according to an illustrative embodiment of the disclosure. The cable 300 of FIG. 3 may include components that are similar to the cables 100, 200 illustrated and described above with reference to FIG. 1 and. Accordingly, the cable 300 may include a plurality of twisted pairs 305A-D disposed in a cable core. A separator 310 may be disposed between at least two of the twisted pairs 305A-D and may function to orient and/or provide desired spacing between two or more of the twisted pairs 305A-D.

The separator 310 illustrated in FIG. 3 has a different construction than the separators 110, 210 illustrated in FIGS. 1 and 2. In particular, the separator 310 is a generally T-shaped separator that approximately bisects (or otherwise divides) the cable core and forms two channels along a longitudinal length of the cable 300 in which the twisted pairs 305A-D are disposed. For example, two twisted pairs 305A, 305B can be disposed in a first channel and the remaining two twisted pairs 305C, 305D can be disposed in a second channel. The separator 310 further includes one or more prongs formed at or near one end of the separator 310. The prong(s) may assist in anchoring the separator 310 to the cable jacket 315 (or other layer that surrounds the core), thereby limiting movement of the separator 310. Additionally, in accordance with an aspect of the disclosure, the separator 310 may include one or more longitudinal channels 330 that facilitate convective heat transfer. As shown, a longitudinal channel 330 is formed within a body portion of the separator 310 without the body portion being expanded or otherwise modified in order to accommodate the channel 330. As desired, the separator 310 may additionally include one or more second channels. In certain embodiments, shielding material may also be incorporated into the separator 310 in a similar manner as that described above with reference to FIG. 1.

With continued reference to FIG. 3, an outer jacket 315 may enclose the internal components of the cable 300. Additionally, any number of shield layers may be utilized to provide shielding for the twisted pairs 305A-D. For example, a first shield layer 320 may be wrapped or otherwise formed around two of the twisted pairs, such as the twisted pairs 305A, 305B disposed in the first channel. A second shield layer 325 may be wrapped or otherwise formed around other twisted pairs, such as twisted pairs 305C, 305D disposed in the second channel. In other words, shield layers may be provided for various groups of twisted pairs disposed within the cable core.

Additionally, respective dielectric separators 335A-D having an H-shaped cross-section are illustrated in FIG. 3 as being disposed or positioned between the individual conductors of the various twisted pairs 305A-D. As described in greater detail above with reference to FIG. 2, these dielectric separators 335A-D may assist in maintaining the position(s) of one or both the individual conductors of the twisted pairs 305A-D.

Similar to the cable 100 illustrated in FIG. 1, the cables 200, 300 illustrated in FIGS. 2 and 3 are provided by way of example only. Embodiments of the disclosure contemplate a wide variety of other cables and cable constructions. These other cables may include more or less components than the cables 200, 300 illustrated in FIGS. 2 and 3. For example, other cables may include alternative shielding arrangements and/or different types of separators or fillers. Additionally, certain components may have different dimensions and/or materials than the components illustrated in FIGS. 2 and 3.

Example Separator Constructions

As set forth above, a separator, such as the separator 110 illustrated in FIG. 1, may be formed with a wide variety of suitable constructions, cross-sectional shapes, and/or dimensions. FIGS. 4A-4J are perspective views of example separator constructions, and the example constructions illustrate a few of the different features that may be incorporated into separators. FIGS. 5A-5B are side view of example separator constructions. Similar to the separator 100 shown in FIG. 1, the separators of FIGS. 4A-4J and FIGS. 5A-5B may have a generally cross-shaped or X-shaped cross section. As desired in other embodiments, a wide variety of other cross-sectional shapes may be utilized, such as any of the example separator constructions illustrated in FIGS. 6A-6Q. Each of these figures is discussed in greater detail below. Additionally, in accordance with an aspect of the disclosure, each of the example separators may include one or more longitudinal channels. Further, any of the example separators may be incorporated into a wide variety of cables, such as the cables 100, 200, 300 illustrated in FIGS. 1-3. In other words, any of the separators illustrated in FIGS. 4A-6Q may be substituted into the cables 100, 200, 300 discussed above and/or incorporated into any other suitable cable designs.

Figure 4A:
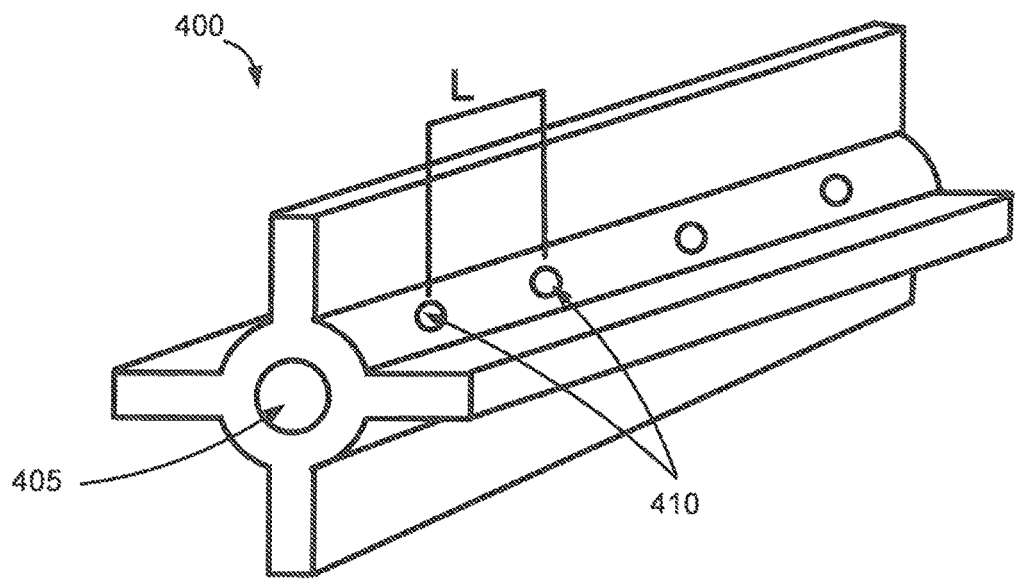
FIGS. 4A-4J are perspective views of example separators that may be incorporated into cables in accordance with various illustrative embodiments of the disclosure.
Figure 5A:
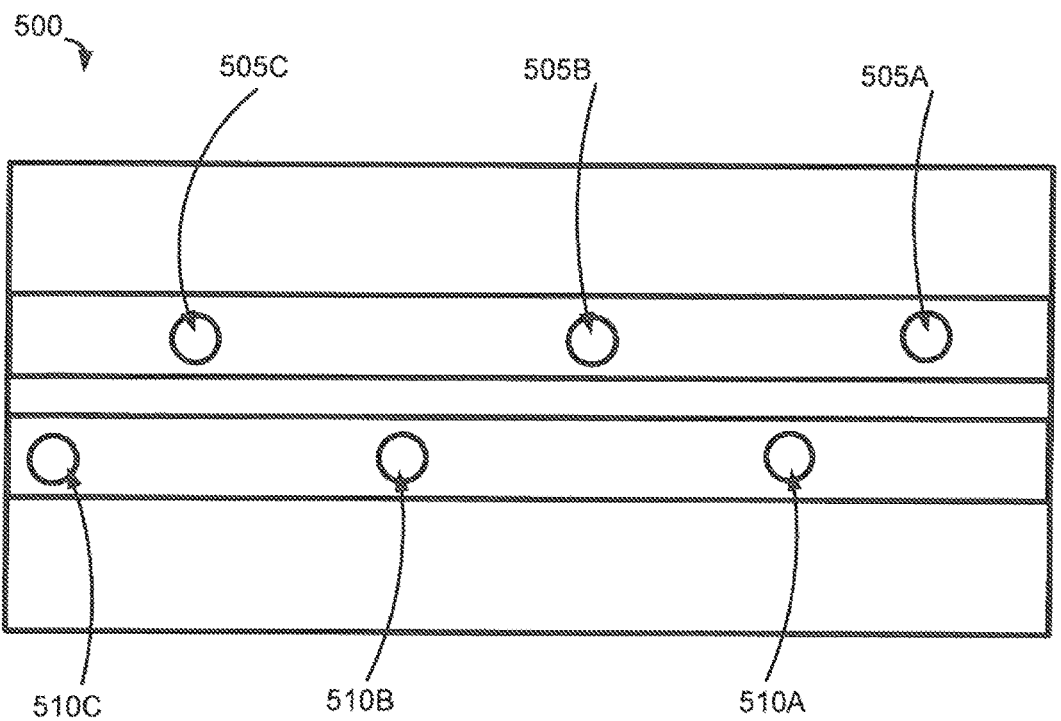
FIGS. 5A-5B are side views of example separators that may be incorporated into cables in accordance with various illustrative embodiments of the disclosure.
Figure 5B:
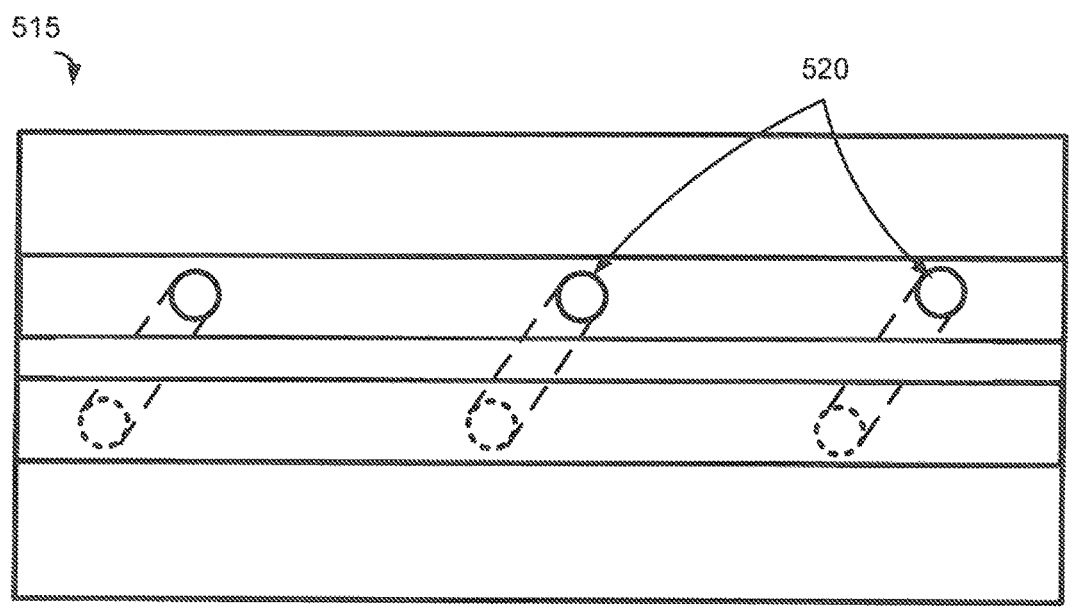

Turning first to FIG. 4A, a perspective view of a first example separator 400 is illustrated. The separator 400 may include at least one longitudinal channel 405 that facilitates convective heat transfer along a longitudinal length of the separator 400. As described above with reference to FIG. 1, any number of longitudinal channels may be incorporated into the separator 400, and each longitudinal channel may have any desired shape, size, and/or other dimensions. Further the longitudinal channel 405 may define an internal cavity through the body of the separator 400.

With continued reference to FIG. 4A, the separator 400 may additionally include a plurality of second channels 410. Each second channel 410 may extend from the longitudinal channel 405 through the body of the separator 400 and to an external surface of the separator 400. In this regard, each second channel 410 may permit the flow of air or other fluid between the longitudinal channel 405 and portions of the core of a cable into which the separator 400 is positioned. As a result, overall convective heat transfer rate of the separator 400 may be enhanced. For example, heat may pass from outside of the separator 400 (e.g., from one or more twisted pairs, etc.) to the longitudinal channel 405 via one or more second channels 410, and the longitudinal channel may facilitate heat transfer/cooling along a longitudinal length of the separator 400 and/or cable in which the separator 400 is incorporated.

As set forth in greater detail above with reference to FIG. 1, each of the second channels 410 may have any suitable shape (e.g., circular, elliptical, etc.), size (e.g., diameter, etc.), and/or other dimensions. Each second channel 410 may also be formed at any desired angle relative to the longitudinal channel 405 (e.g., a ninety degree angle, an acute angle, etc.). Additionally, any number of second channels 410 may be incorporated into the separator 400. A wide variety of configurations and/or arrangements of second channels may be utilized. In certain embodiments, one or more second channels may be positioned at a plurality of respective points along the longitudinal length of the separator. For example, second channels 410 may be spaced along the separator 400 in a pattern or with a repeating step. A wide variety of suitable spacings or distances "L" may be present between second channels, such as spacings of approximately 0.05 meters, 0.1 meters, 0.25 meters, 0.5 meters, 1.0 meters, 1.5 meters, 2.0 meters, 2.5 meters, 3.0 meters, 4.0 meters, 5.0 meters, a spacing included in a range between any two of the above values, and/or a spacing that is included in a range bounded on either a minimum or maximum end by one of the above values. In other embodiments, second channels 410 may be positioned along the separator 400 in accordance with a random or pseudo-random pattern.

In certain embodiments, a single second channel may be formed at each respective cross-sectional location along a longitudinal length of the separator 400. In other embodiments, a plurality of second channels may be formed at one or more locations at which second channels are positioned. For example, a first one of the second channels may open at a first point along an outer periphery of the separator 400 (e.g., a location proximate to a first twisted pair) while a second one of the second channels may open at a second point along an outer periphery of the separator 400 (e.g., a location proximate to a second twisted pair). Any number of second channels may be formed at a given location. For example, a second channel may be formed that corresponds to each of the twisted pairs. As another example, a second channel may be formed that corresponds to each prong or extension of the separator 400.

In other embodiments, one or more second channels having a first orientation may be formed at a first longitudinal position along the separator 400 while one or more additional second channels having a second orientation may be formed at a second longitudinal position along the separator 400. For example, at a first position, a second channel may be formed that opens at a location proximate to a first twisted pair and, at a second position, an additional second channel may be formed that opens at a location proximate to a second twisted pair. As another example, second channels may be formed diagonally through the separator 400, and the direction of the formation may be altered such that a first one of the second channels opens proximate to a first and third twisted pair while a second one of the second channels opens proximate to a second and fourth twisted pair. A wide variety of other suitable configurations may be utilized as desired, and those discussed herein are provided by way of example only.

A wide variety of suitable methods and/or techniques may be utilized to form second channels 410. In certain embodiments, one or more suitable punches, drills, blades, laser, or other suitable cutting tools may be utilized to form second channels 410 either partially or completely through the body of the separator 400. For example, a channel may be formed from an external surface of the separator 400 through the body to the longitudinal channel 405. In this regard, a single second channel may be formed. As another example, a channel may be formed completely through the separator 400 such that it passes through the longitudinal channel 405. In this regard, two second channels may be formed. In certain embodiments, the separator 400 may be passed through or near the cutting tool(s) such that second channels may be formed at various locations along the longitudinal length of the separator 400. As desired, a first set of one or more cutting tools may be utilized to form second channels having a first orientation, and a second set of one or more cutting tools may be utilized to form second channels having a second orientation. Any number of cutting tools and/or sets of cutting tools may be utilized in various embodiments in order to form a separator 400 with a desired configuration of second channels.

Figure 4B:
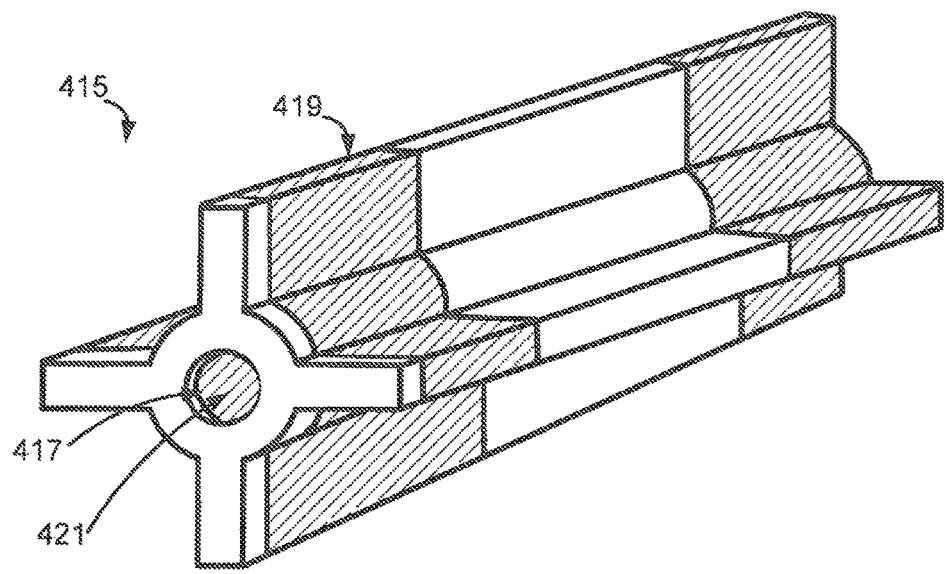

FIG. 4B illustrates another example separator 415 that may facilitate convective heat transfer along its longitudinal length. Much like the separator 400 of FIG. 4A, the separator 415 of FIG. 4B may include one or more longitudinal channels, such as the illustrated longitudinal channel 417. Additionally, the separator 415 may include shielding material that provides electromagnetic shielding for the twisted pairs and/or other transmission media incorporated into a cable. As shown, the separator 415 may include first shielding material 419 formed on its external surface and second shielding material 421 formed inside the longitudinal channel 417, for example, on a surface that defines the longitudinal channel 417.

As set forth above with reference to FIG. 1, a wide variety of suitable types of shielding material may be utilized, such as electrically conductive material (e.g., aluminum, etc.). Additionally, shielding material may be formed in accordance with a wide variety of suitable configurations. For example, in certain embodiments, relatively continuous shielding material may be formed along a longitudinal length of the separator 415. In other embodiments, discontinuous patches of shielding material may be formed, and dielectric spaces or gaps may be present between adjacent patches. A wide variety of suitable patterns of shielding material may be utilized as desired, and a few example patterns are described in greater detail below with reference to FIGS. 7A-7G. These patterns may include a wide variety of patch sizes and/or dimensions, as well as a wide variety of suitable gap sizes between patches. Additionally, in certain embodiments, discontinuous patches of shielding material may be formed in a random or pseudo-random manner.

Additionally, a wide variety of different relationships may exist between the shielding material 419 formed on an external surface of the separator 415 and the shielding material 421 formed inside the longitudinal channel 417. For example, in certain embodiments, a similar pattern may be formed on the external surface and within the longitudinal channel 417. In other embodiments, the patches 421 formed within the longitudinal channel 417 may correspond to or cover gaps or spaces between adjacent patches 419 formed on the external surface and vice versa. In yet other embodiments, a first patch pattern may be utilized on the external surface while a second patch pattern is utilized within the longitudinal channel 417. In yet other embodiments, a first pattern may be utilized on the external surface, and a random or pseudo-random patch configuration may be utilized within the longitudinal channel 417. In yet other embodiments, a first pattern may be utilized on the external surface, and a continuous layer of shielding material may be formed within the longitudinal channel 417 or vice versa. Indeed, a wide variety of different patterns and/or shielding configurations may be incorporated into the separator 415.

A wide variety of suitable methods or techniques may be utilized to form shielding material on both the external surface of the separator 415 and/or within the longitudinal channel 417. For example, once the separator 415 has been formed (e.g., extruded, molded, etc.), shielding material may be deposited on, adhered to, or otherwise formed on or attached to the separator 415. Examples of suitable methods for forming shielding material include, but are not limited to, application of metallic ink or paint, liquid metal deposition, vapor deposition, welding, heat fusion, adherence of patches to the dielectric, and/or etching of patches from a metallic sheet.

Figure 4C:
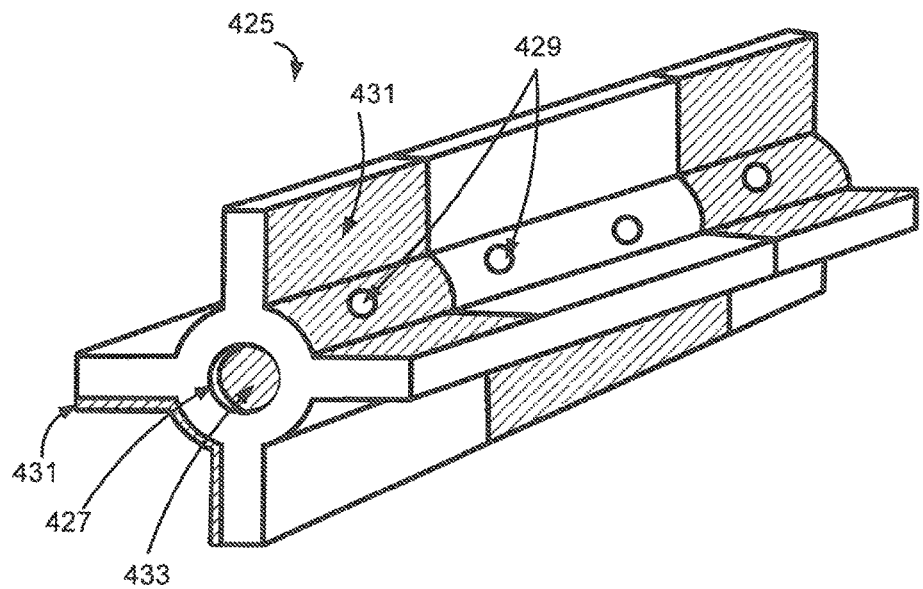

FIG. 4C illustrates another example separator 425 that may be utilized in various embodiments of the disclosure. Similar to the separators 400, 415 of FIGS. 4A and 4B, the separator 425 may include one or more longitudinally extending channels, such as longitudinal channel 427. Much like the separator 400 of FIG. 4A, the separator 425 may include one or more secondary channels 429. Additionally, the separator 425 may include shielding material, such as first shielding material 431 formed on an external surface and second shielding material 433 formed inside the longitudinal channel 427.

The shielding material may be formed and/or positioned in accordance with a wide variety of suitable patterns and/or configurations. The shielding material 431 of FIG. 4C includes discontinuous patches of shielding material that are formed in a different pattern than that illustrated in FIG. 4B. More particularly, in FIG. 4B, each patch of shielding material is illustrated as being formed around an outer periphery the separator 415. By contrast, in the separator 425 of FIG. 4C, each patch formed on the external surface only extends partially around the outer periphery of the separator 415. As shown, in certain embodiments, each patch may extend approximately one quarter around the outer periphery of the separator 415. In other words, each patch may cover a portion of the separator 415 that is proximate to one of the twisted pairs of a cable. As desired in various embodiments, a patch may cover any desired portion of the surface of a separator 415 and/or may extend any desired amount around an outer periphery of the separator 415. For example, patches may extend approximately halfway around an outer periphery of the separator 415.

Additionally, in certain embodiments, patches of shielding material may be alternated between various portions of the separator 415 along its longitudinal length. As shown in FIG. 4C, at a first position along a longitudinal length of the separator 415, respective patches may be formed that are proximate to a first twisted pair and a third twisted pair in a four pair cable. At a second position along the longitudinal length of the separator 415, respective patches may be formed that are proximate to a second twisted pair and a fourth twisted pair of the cable. In other words, at any given location, patches may be formed diagonally across from one another, and the pattern may be alternated along the separator's longitudinal length. A wide variety of other suitable patch configurations may be formed as desired in various embodiments. For example, patches may be alternated between individual quadrants of a separator along its longitudinal length. As another example, patches may be altered between a top half and a bottom half of a separator along its longitudinal length. The patch configurations discussed herein are provided by way of non-limiting example only. Further, a wide variety of suitable patch configurations may be formed within a longitudinal channel 427 of the separator 427.

Figure 4D:
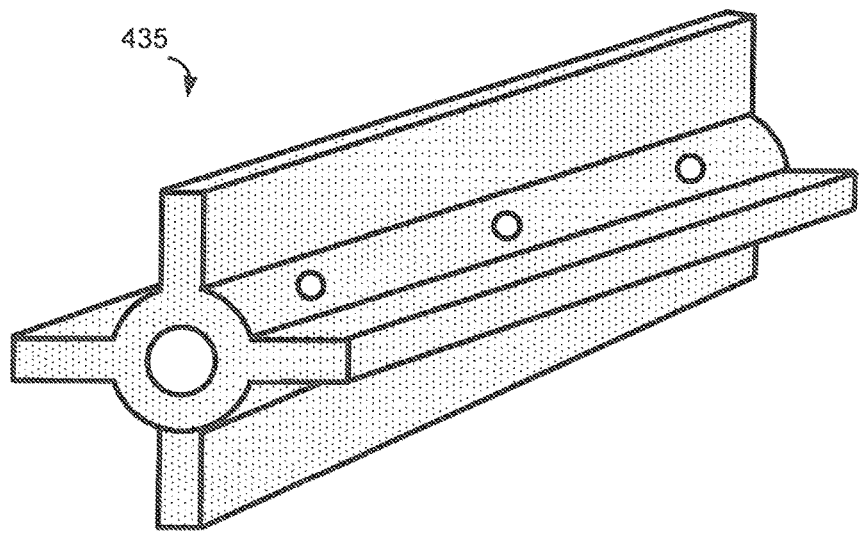

FIG. 4D illustrates another example separator 435 that may be utilized in various embodiments of the disclosure. In contrast to separators having shielding material formed on one or more surfaces, the separator 435 of FIG. 4D may include a body portion that is at least partially formed from a shielding material. Additionally, the separator 435 may include any number of longitudinal channels and, as desired in various embodiments, any number of secondary channels.

A wide variety of suitable shielding materials may be incorporated into the separator 435 as desired in various embodiments. In certain embodiments, the separator 435 may be formed (e.g., extruded, molded, etc.) from a suitable shielding material. Examples of suitable materials that may be utilized to form the separator 435 include, but are not limited to, one or more metallic materials (e.g., silver, copper, nickel, steel, iron, annealed copper, gold, aluminum, etc.), metallic alloys, conductive composite materials, semi-conductive materials (e.g., silicon, etc.), and/or dielectric shielding materials (e.g., barium ferrite, etc.). In other embodiments, shielding material may be mixed or blended into a suitable base material (e.g., a polymeric material, etc.) that is utilized to form the separator 435. In yet other embodiments, shielding material may be embedded in a base material or suspended within a matrix of base material.

Figure 4E:
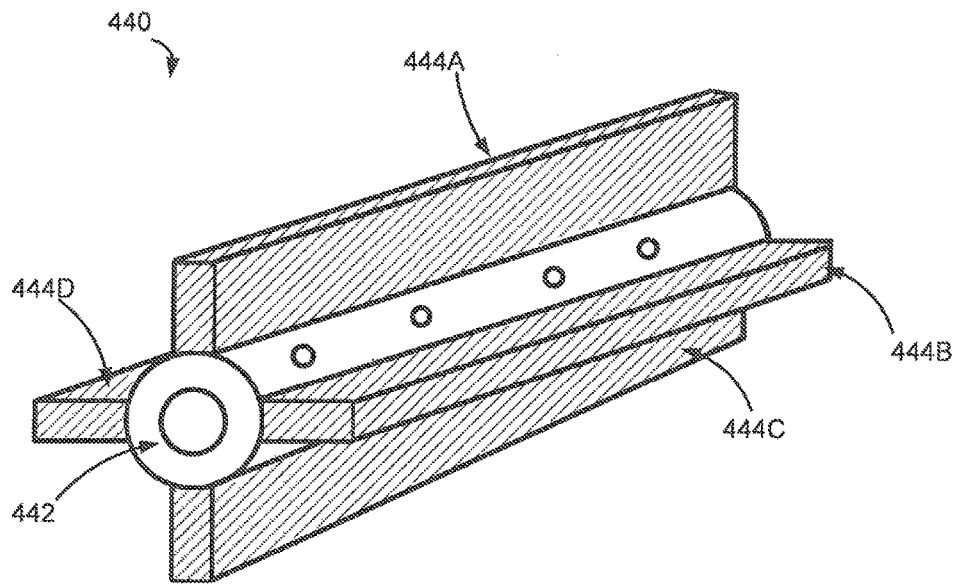

Turning now to FIG. 4E, another example separator 440 construction is illustrated. The separator 440 may include a central portion 442 that is formed from a first material, such as a polymeric material. Additionally, the separator 440 may include any number of fins, extensions, or prongs that extend from the central portion 442. As shown, the separator 440 may include four prongs 444A-D, and each prong may respectively extend between two of the twisted pairs of a cable. Further, at least one of the prongs (generally referred to as prong 444) may include a shielding material. For example, a prong 444 may be formed (e.g., molded, case, extruded, etc.) from a suitable shielding material. As another example, shielding material may be mixed into, blended into, or embedded within a base material to form a prong 444. As yet another example, shielding material may be formed on the surface of a prong 444. As set forth above, a wide variety of suitable shielding materials may be utilized.

In the event that a prong 444 is formed from different materials or includes a different base material than the central portion 442, a wide variety of suitable techniques may be utilized to attach the prong 444 to the central portion 442. For example, the prong 444 may be extend through the central portion 442 into a longitudinal channel. As desired, an end of the prong 442 positioned within the longitudinal channel may be processed (e.g., folded over, widened, etc.) such that the prong 444 is held in place. In other embodiments, a single prong 444 may extend through the longitudinal channel such that it extends from opposite sides of the central portion 442. As desired in various embodiments, a prong 442 may be adhered, welded, or otherwise attached or affixed to the central portion 442.

In certain embodiments, such as embodiments in which a prong 444 is formed from a shielding material, a prong 444 may function as a heat sink that pulls or draws heat into a longitudinal channel. In this regard, the prong 444 may assist in cooling a cable and/or normalizing a temperature within the cable. Additionally, although FIG. 4E illustrates prongs that are completely formed from or that include continuous shielding or heat sink material along a longitudinal length of the separator 440, in other embodiments, one or more respective portions positioned along a longitudinal length of a prong 444 may include shielding and/or heat sink material. For example, a prong 444 may be formed from alternating metallic and dielectric portions. As desired, various sections of a prong 444 may have any suitable longitudinal lengths and/or other dimensions. Further, sections may be arranged in accordance with a wide variety of suitable patterns or, alternatively, sections may be arranged in a random or pseudo-random manner. A few of the examples discussed herein with respect to patch configurations may be equally applicable to prong construction.

Figure 4F:
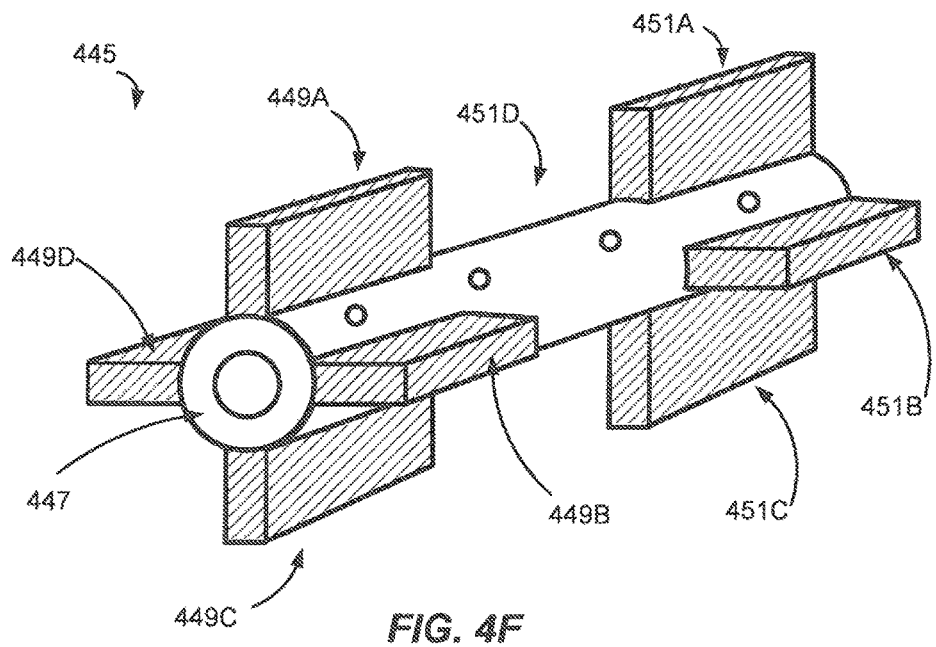

FIG. 4F illustrates another example separator 445 in which one or more prongs are attached to a central portion 447. However, in contrast to the separator 440 of FIG. 4E, each of the prongs in FIG. 4F does not extend along a continuous longitudinal length of the separator 445. In other words, a first set of prongs 449A-D may be formed at a first location along a longitudinal length of the separator 445, a second set of prongs 451A-D may be formed at a second location along the longitudinal length of the separator 445, and so on. A gap or spacing, such as an air gap, may be present between adjacent prongs in each of the sets. Each of the prongs may be formed from a wide variety of suitable materials and/or with a wide variety of suitable dimensions. As shown, each of the prongs is formed from a shielding and/or heat sink material. In other embodiments, a portion of the prongs may be formed from shielding and/or heat sink material while another portion of the prongs is formed from other materials (e.g., dielectric materials, flame retardant materials, etc.). Further, as desired, only a portion of a given prong may be formed from or include shielding and/or heat sink material. Indeed, prongs may be formed with a wide variety of suitable constructions.

As desired, the construction of prongs may be varied within a given set of prongs and/or between sets of prongs. For example, a first set of prongs may be formed as heat sinks while another set of prongs is formed from alternate materials (e.g., dielectric material, etc.). As desired, dimensions of prongs may vary between different sets. For example, a first set of prongs that functions as heat sinks may have first longitudinal lengths, and a second set of prongs formed from different materials may have second longitudinal lengths. Additionally, although FIG. 4F only illustrates prongs that do not extend along the longitudinal length of the separator 445, in other embodiments, a portion of the prongs may be continuous along the longitudinal length of the separator while another portion of the prongs does not extend along the longitudinal length. For example, the top and bottom prongs may be continuous while a plurality of prongs is formed along each side. Indeed, a wide variety of suitable prong arrangements and/or constructions may be utilized in various embodiments, and those described herein are provided by way of non-limiting example only.

The example separators illustrated in FIGS. 4A and 4C-4F illustrate second channels that are formed through portions of the separator other than the extensions or prongs. In other words, second channels may be formed through separators such that they open in proximity to twisted pairs positioned adjacent to the separators. In other embodiments, second channels may be formed through other portions of the separator. For example, as illustrated in the separator 455 of FIG. 4G, second channels 457 may be formed through one or more of the prongs of a separator 455. As shown, a second channel 457 may be formed from the longitudinal channel through a prong such that it opens at the distal end of the prong. In other embodiments, a second channel may be formed at an angle through the prong or, alternatively, a second channel may curve, bend, or change direction within a prong. In this regard, the second channel may open along a surface of the prong that faces at least one twisted pair.

Figure 4G:
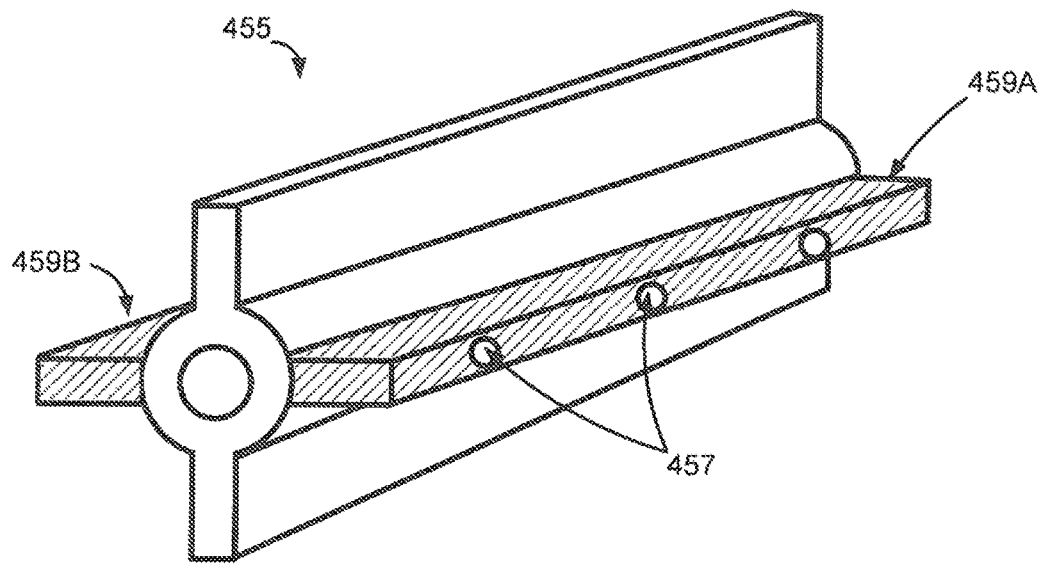

With continued reference to FIG. 4G, at least a portion of the prongs 459A, 459B may function as heat sinks. In other words, one or more prongs 459A, 459B may be formed at least partially from suitable heat sink materials (e.g., metal, etc.). The heat sink portions of a prong may be continuous along a longitudinal length of the prong or, alternatively, one or more discontinuous portions of heat sink material may be incorporated into a prong. Further, in certain embodiments, one or more second channels may be formed through a prong or portions of a prong that includes heat sink material. In this regard, the heat sink material and a second channel formed through the heat sink material may collective work to draw heat into a longitudinal channel.

Figure 4H:
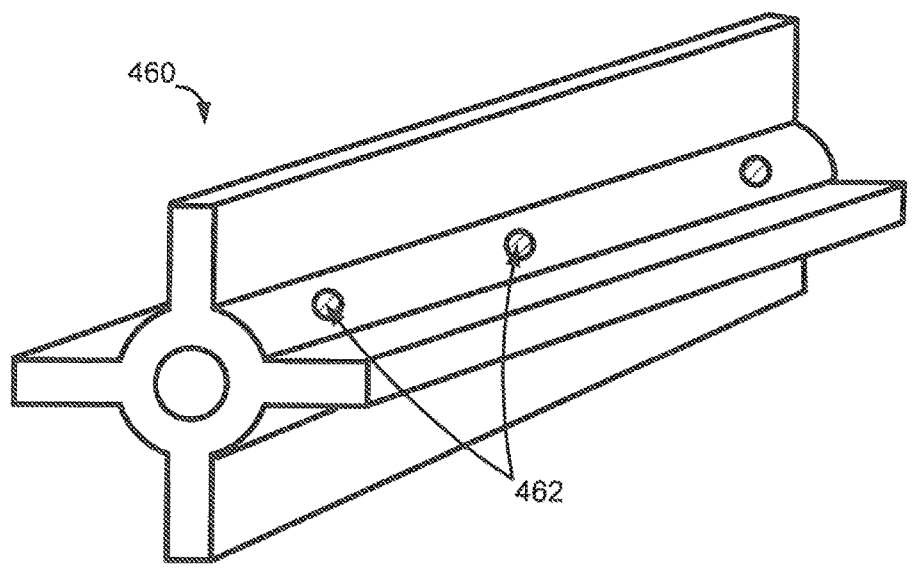

FIG. 4H illustrates an example separator 460 in which heat sink material (e.g., metallic material, etc.) is positioned within one or more second channels 462. For example, a second channel 462 may be lined with heat sink material. In other words, heat sink material may be formed on, adhered to, affixed to, embedded near, or otherwise associated with at least a portion of an internal surface of a second channel 462. The heat sink material may work in conjunction with the second channel 462 to draw heat into a longitudinal channel.

Figure 4I:
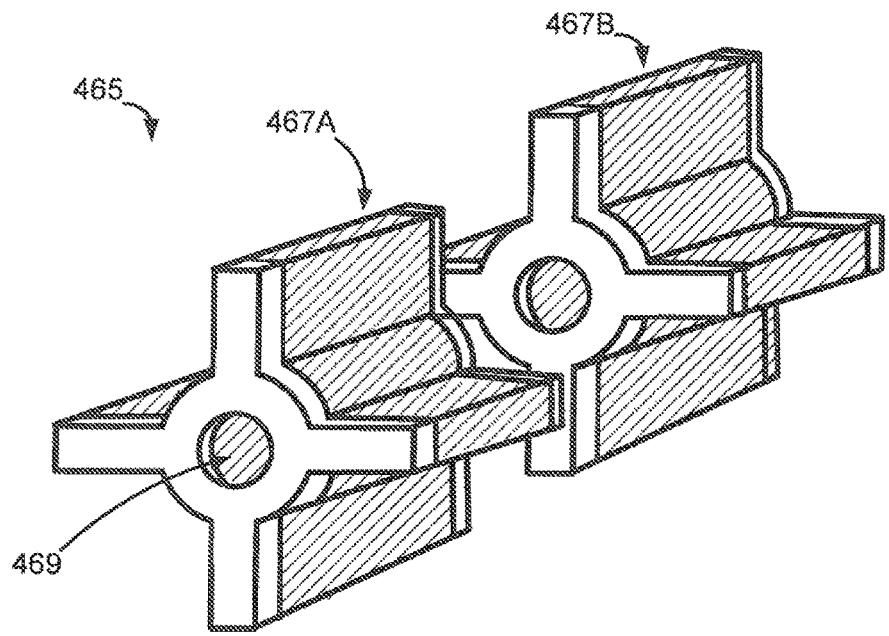
Figure 4J:
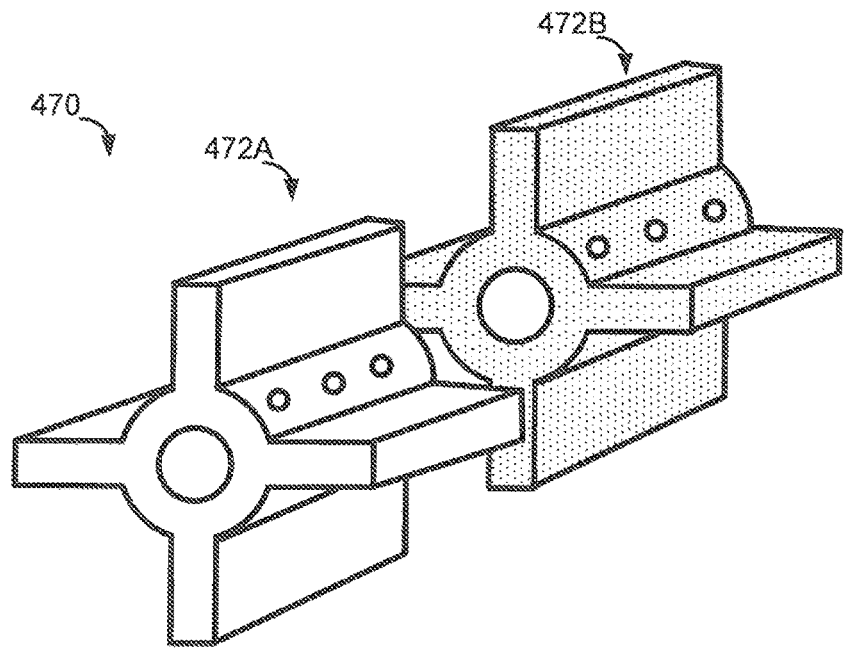

The separators illustrated in FIGS. 4A-4H are continuous along their entire longitudinal length. In other words, each of the separators includes at least one portions that is continuous along the entire longitudinal length. In other embodiments, a separator may be formed from a plurality of severed or discrete portions that are arranged adjacent to one another (e.g., end to end) along a longitudinal length of a cable. FIGS. 4I and 4J illustrate examples of severed separators that include a plurality of discrete portions. Much like separators discussed above with reference to FIGS. 4A-4H, the separators of FIGS. 4I and 4J may include at least one longitudinal channel and, as desired, second channel(s), shielding material, and/or heat sinks.

Turning first to FIG. 4I, a first example severed separator 465 is illustrated. The separator 465 may include any number of discrete segments or portions, such as segments 467A and 467B. None of the segments or portions will individually extend along an entire longitudinal length of the separator 465 or a cable into which the separator 465 is incorporated. However, the segments may be arranged end to end in order to form a longitudinally extending separator 465. As explained in greater detail above with reference to FIG. 1, each of the segments may have a wide variety of constructions and/or dimensions (e.g., cross-sectional shapes, lengths, etc.).

A respective longitudinal channel is formed through a body portion of each of the illustrated segments 467A, 467B. When the segments are arranged end to end, a single longitudinal channel 469 will extend along the length of the separator 465. In certain embodiments, the segments may be arranged such that they contact one another at the edges. Such an arrangement provides for enhanced flexibility of the separator 465; however, the longitudinal channel 469 may be approximately continuous along the separator's length.

As desired, one or more of the segments 467A, 467B may additionally include one or more second channels formed from the longitudinal channel 469 to an external surface.

Additionally, in certain embodiments, shielding material may be incorporated into one or more segments 467A, 467B of the separator 465. For example, as illustrated, shielding material may be formed on one or more surfaces of one or more separator segments 467A, 467B, such as a surface of the longitudinal channel 469 and/or on an external surface. In certain embodiments, a single patch of shielding material may be formed on each separator segment. Additionally, the shielding material formed on a segment may not extend all the way to at least one of the longitudinal edges of the segment. In other words, a dielectric portion may be situated on at least one longitudinal end of the segment. As a result, when the segments are longitudinally arranged, a discontinuous shielding arrangement may be formed along the longitudinal length of the separator 465. In other embodiments, a plurality of patches of shielding material may be formed on a surface of a separator segment. Additionally, although the separator 465 of FIG. 4I includes patches of shielding material formed on one or more surfaces, other suitable techniques may be utilized to incorporate shielding material into one or more separator segments as described in greater detail above.

FIG. 4J illustrates another example severed separator 470. The separator 470 may include any number of discrete segments that may be arranged in a longitudinal manner. Additionally, the separator 470 may include one or more longitudinal channels and, as desired, any number of second channels. In certain embodiments, at least two of the separator segments may be formed from different materials and/or may have a different construction. For example, a first segment 472A may be formed from a first set of one or more materials, and a second segment 472B may be formed from a second set of one or more materials. In one example embodiment, a first segment 472A may be formed from one or more polymeric materials, flame retardant materials and/or other suitable materials while a second segment 472B may be formed from one or more shielding materials (e.g., electrically conductive material, semi-conductive material, dielectric shielding material, etc.). A wide variety of other segment constructions may be utilized as desired. Additionally, each segment may have any suitable length and/or other dimensions.

As desired, a separator may include any number of second channels. Additionally, any number of second channels may be formed at a given cross-sectional locations along a longitudinal length of a separator. FIG. 5A illustrates a side view of an example separator 500 in which second channels are formed with different orientations at different points along the longitudinal length of the separator 500. More particularly, the orientation of second channels is alternated along the separator 500. For example, a first set of second channels 505A-C may extend from a longitudinal channel through the separator body and open within a first portion on the outer circumference of the separator 500, such as a portion adjacent to a first twisted pair. A second set of second channels 510A-C may extend from the longitudinal channel through the separator body and open within a second portion on the outer circumference of the separator 500 that is different than the first portion, such as a second portion adjacent to a second twisted pair.

As desired, the first set of second channels 505A-C may extend all the way through the separator 500 such that each second channel also opens on another portion of the outer circumference opposite the first portion, such as a portion adjacent to a third twisted pair. Similarly, the second set of second channels 510A-C may extend through the separator 500 such that each channel also opens within a portion adjacent to a fourth twisted pair. A wide variety of other second channel orientations may also be utilized in conjunction with separators as desired. FIG. 5A is provided by way of non-limiting example only to illustrate one example in which at least two second channels have different orientations.

FIG. 5B illustrates a side view of an example separator 515 in which one or more second channels 520 are formed at an acute angle relative to a longitudinal channel. As described above, a second channel may be formed at any suitable angle relative to a longitudinal channel. For example, in certain embodiments, a second channel may be formed such that it is perpendicular to the longitudinal channel. In other embodiments, such as the embodiment illustrated in FIG. 5B, one or more second channels may be formed at an acute angle relative to the longitudinal channel. In other words, a first end of a second channel may be positioned at a first cross-sectional point along a longitudinal length of the separator 515 while an opposite end of the second channel is positioned at a second cross-sectional point along the longitudinal length of the separator 515. Additionally, as described in greater detail above with reference to FIG. 1, a second channel may be formed at any suitable angle relative to the longitudinal channel.

Figure 6A:
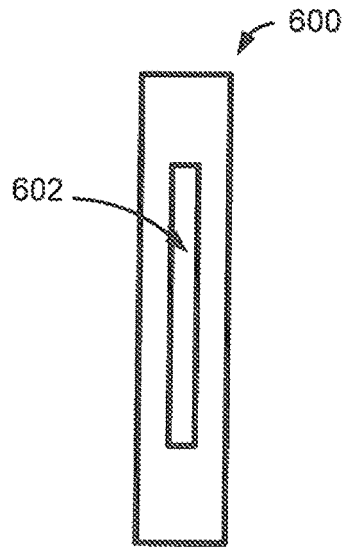
FIGS. 6A-6Q are cross-sectional views of example separators that may be incorporated into cables in accordance with various illustrative embodiments of the disclosure.

The example separators illustrated in FIGS. 4A-5B each have an approximate cross or X-shaped cross-sectional shape. In other embodiments, separators may be formed with a wide variety of other suitable cross-sectional shapes. FIGS. 6A-6Q illustrate cross-sectional views of example separators that may be utilized in accordance with various embodiments of the disclosure. FIG. 6A illustrates an example separator 600 having a relatively flat shape. The separator 600 may be positioned between two or more of the twisted pairs of a cable. For example, the separator 600 may be positioned within the cable in order to bisect (or otherwise divide) a cable core, and two twisted pairs may be disposed on either side of the separator 600.

The separator 600 is illustrated as including a single longitudinal channel 602; however, in other embodiments, the separator 600 may include a plurality of longitudinal channels. Additionally, the separator 600 has a relatively uniform thickness. In other words, the longitudinal channel 602 may be formed through the separator 600 without modifying or expanding the outer circumference and/or other dimensions of the separator 600 to accommodate the channel 602. Further, the longitudinal channel 602 may be formed with a wide variety of suitable shapes and/or dimensions. As shown, the longitudinal channel 602 has a relatively thin rectangular cross-sectional shape. In other embodiments, the longitudinal channel 602 may have a circular, elliptical, square, or other suitable shape.

Figure 6B:
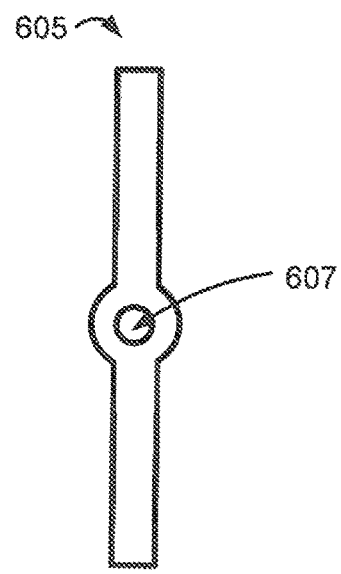

FIG. 6B illustrates another example separator 605 having a relatively flat shape. In other words, the separator 605 may be positioned within a cable in order to bisect a cable core. However, in contrast to the separator 600 of FIG. 6B, the thickness of the separator 605 may be modified in order to accommodate one or more longitudinal channels. For example, a longitudinal channel 607 may be formed with dimensions (e.g., a circumference for a circular channel, etc.) that result in the expansion of a body portion of the separator 605 away from purely flat shape in order to accommodate the channel 607. In other words, areas of the separator 605 through which a longitudinal channel is formed may have a different thickness than other areas of the separator 605.

Figure 6C:
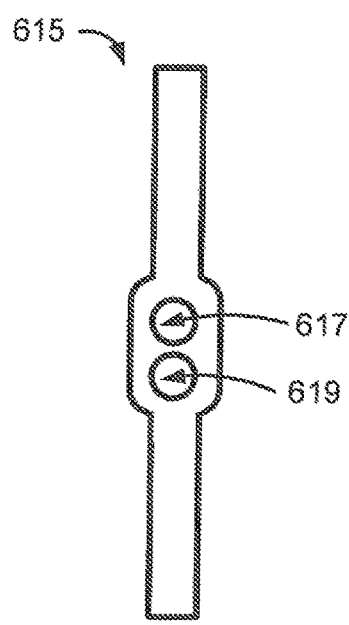
Figure 6D:
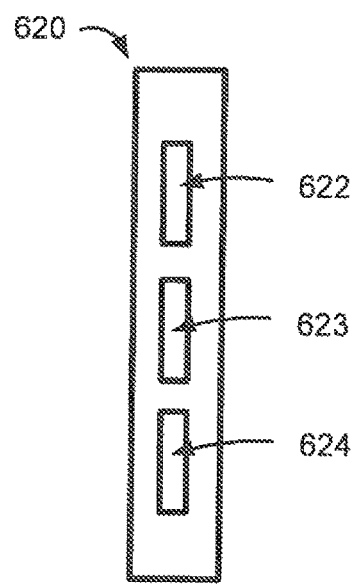

FIG. 6C illustrates another example separator 615 having a relatively flat shape. Much like the separator 605 of FIG. 6B, the thickness and/or other dimensions of the separator 615 may be modified in order to accommodate one or more longitudinal channels. However, in contrast to the separator 605 of FIG. 6B, the separator 615 is illustrated as including two longitudinal channels 617, 619. For separators with multiple longitudinal channels, the longitudinal channels may be arranged in any suitable configuration. For example, as illustrated in FIG. 6C, the longitudinal channels may be positioned in a top to bottom row along the separator 615. In other embodiments, two or more longitudinal channels may be arranged in a side by side configuration. FIG. 6D illustrates another example separator 620 having a relatively flat shape and a plurality of longitudinal channels. The separator 620 is illustrated as having a relatively uniform thickness with three longitudinal channels 622, 623, 624 formed through a body portion. As shown, the longitudinal channels 622, 623, 624 are arranged in a row with a central channel 623 formed approximately through a midpoint of the flat separator 620. Other configurations of channels may be incorporated into flat separators as desired in other embodiments. Additionally, the separators and/or longitudinal channels may include any suitable dimensions.

Figure 6E:
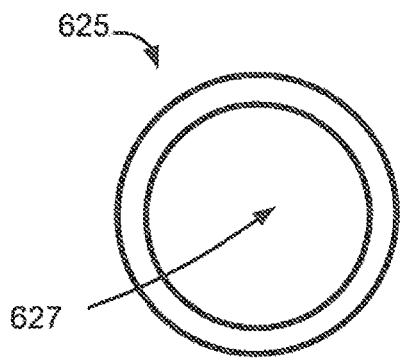
Figure 6F:
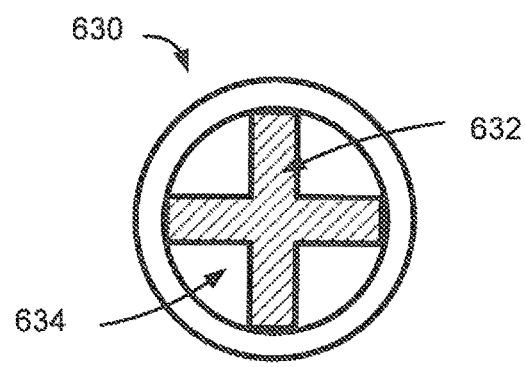

FIG. 6E illustrates an example separator 625 having a rod shape. The separator 625 may have a circular or elliptical cross-section, and at least one longitudinal channel 627 may be formed through the separator 627. As shown, the longitudinal channel 627 may have a relatively circular cross-sectional shape; however, in other embodiments, the longitudinal channel 627 may be formed with other suitable shapes (e.g., rectangular, square, elliptical, etc.). Additionally, as shown in FIG. 6F, a rod shaped separator 630 may be formed that includes one or more internal ribs or dividers 632 positioned within an internal cavity 634. In certain embodiments, the internal rib(s) 632 may provide structural support to the separator 630 and/or assist the separator 630 in maintaining its shape. Additionally, the internal rib(s) 632 may divide an internal cavity into any desired number of longitudinal channels.

In certain embodiments, a separator may have a relatively uniform body portion that is formed from the same material or group of materials. In other embodiments, different components of the separator body may be formed from different materials. For example, with reference to FIG. 6F, the internal rib(s) 632 or internal support structure may be formed from different materials than the outer rod-shaped or tube portion of the separator 630. In certain embodiments, the outer rod-shaped portion may be formed from one or more polymeric or dielectric materials (which may have shielding material formed on one or more surfaces), and the internal rib(s) 632 may be formed from and/or include one or more heat sink materials. For example, the internal rib(s) 632 may be formed from one or more metallic materials and/or include one or more longitudinally spaced metallic portions that function as heat sinks within the separator 630. Other suitable constructions and/or groups of materials may be utilized as desired in other embodiments.

Figure 6G:
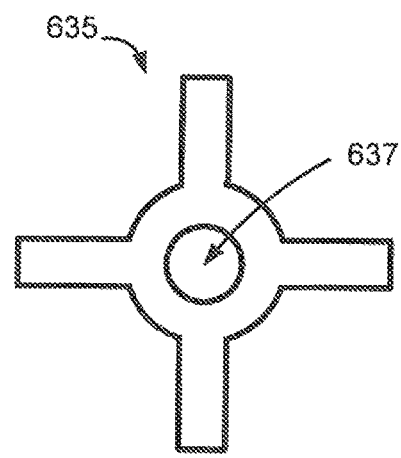

FIG. 6G illustrates an example separator 635 having an approximate cross, plus, or X-shape. The separator 635 may form four channels, and a respective twisted pair may be positioned within each channel. As shown, the separator 635 includes four fins extending from a central portion. However, as desired in other embodiments, one or more of the fins may be offset from the central point. Additionally, as desired, one or more extensions (not shown) may extend laterally from the ends of one or more of the fins. The extensions may be configured to contact the outer jacket of a cable (or any intermediate shielding or other layer) and may assist in holding the separator 635 in place. Additionally, at least one longitudinal channel 637 may be formed through the separator 635. Much like the separator 605 of FIG. 6B, a thickness and/or other suitable dimensions of the separator 635 may be modified in order to accommodate the longitudinal channel 637.

Figure 6H:
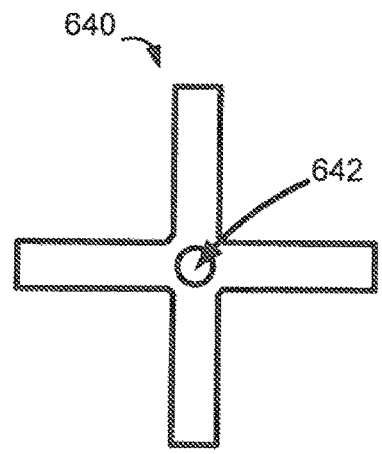
Figure 6I:
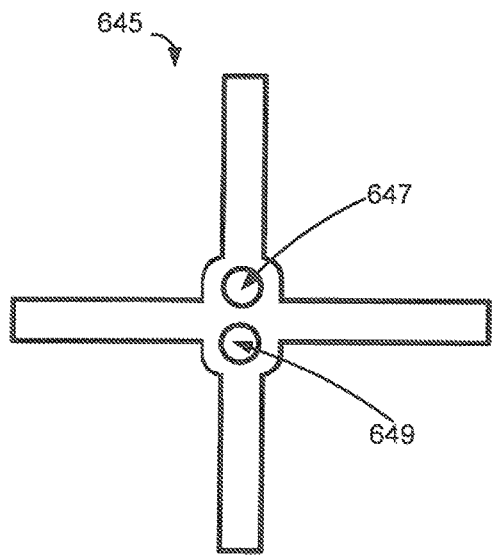

FIG. 6H illustrates another example cross-shaped separator 640 in which a longitudinal channel 642 is formed through a body portion. However, the dimensions of the separator body are not material modified or expanded in order to accommodate the longitudinal channel 642. In other words, barring any processing limitations, the thickness of various separator portions (e.g., a central portion, the prongs or extensions, etc.) may be approximately equal or uniform. FIG. 6I illustrates another example cross-shaped separator 645 in which a plurality of longitudinal channels 647, 649 are formed through a body portion. Any number of longitudinal channels may be incorporated into the separator 645 as desired. Additionally, although the separator 645 is illustrated as having an expanded body portion to accommodate the longitudinal channels 647, 649, other embodiments may include relatively uniform component thicknesses.

Figure 6J:
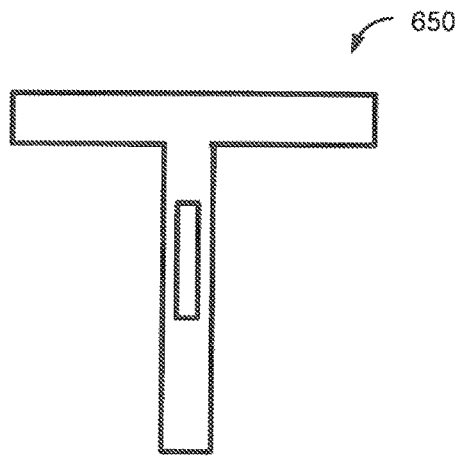

FIG. 6J illustrates an example separator 650 having a T-shape cross-section. The separator 650 may include a first portion or segment that bisects (or otherwise divides) a cable core, thereby forming two channels in which twisted pairs are disposed. For example, two twisted pairs can be disposed in a first channel and an additional two twisted pairs can be disposed in a second channel. Additionally, the separator 650 may include a second portion connected at one end of the first portion at an approximately 90 degree angle. In certain embodiments, the first portion may contact the second portion at an approximate midpoint of the second portion. In other embodiments, the connection may be offset from a midpoint of the second portion. Additionally, as desired, the first portion may extend through the second portion any desired distance. The second portion may be configured to contact the outer jacket of a cable (or any intermediate shielding or other layer) and may assist in holding the separator 650 in place. As desired, the separator 650 may include any number of longitudinal channels. Further the separator 650 and/or various components of the separator 650 may include a wide variety of suitable dimensions.

Figure 6K:
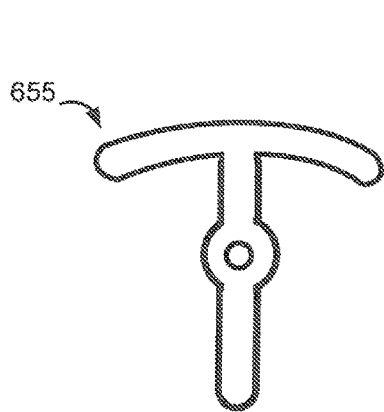
Figure 6L:
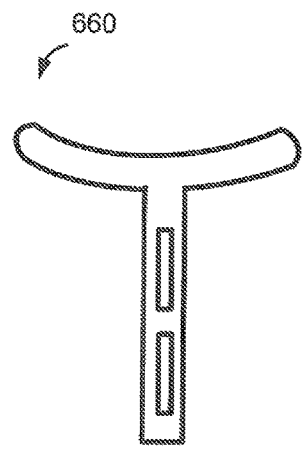

FIG. 6K illustrates an example separator 655 having a first segment that bisects (or otherwise divides) a cable core and a second segment having a concave shape. Similar to the separator 650 illustrated in FIG. 6J, the first segment may form two channels in which twisted pairs are disposed. The second segment may be connected to the first segment, and the second segment may be configured to contact the outer jacket of a cable (or an intermediate layer) in order to hold the separator 655 in place. Any number of longitudinal channels may be incorporated into the separator 655, and various separator components may include any suitable dimensions. FIG. 6L illustrates another example separator 660 similar to the separators 650, 655 illustrated in FIGS. 6J and 6K. However, the separator 660 of FIG. 6L has a second portion with a convex shape. The convex second portion may be configured to hold the separator 660 in place as it contacts an outer jacket (or intermediate layer) of a cable. Additionally, the convex second portion may initially create a separation or gap between portions of the separator 660 and the outer jacket. The separation or gap may be removed as the separator 660 is deformed during assembly (e.g., application of the outer jacket), storage, and/or installation of the cable, and the deformation may result in a tighter bond being formed between the separator 660 and outer jacket. The separator 660 may also include any number of longitudinal channels, and various separator components may include any suitable dimensions.

Figure 6M:
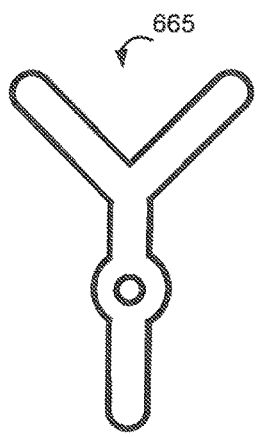

FIG. 6M illustrates an example separator 665 having a Y-shape. The separator 665 may include a first portion that bisects (or otherwise divides) a cable core, thereby forming two channels in which twisted pairs can be positioned. A second portion and a third portion may extend from one end (or from another desired point) of the first portion. The second and third portions may each extend at a desired angle in order to form the Y-shape separator 665. The opposite ends of the second and third portions may contact the outer jacket (or intermediate layer) of a cable, thereby assisting in holding the separator 655 in place. Additionally, the second and third portions may be deformed in a similar manner as that described above for the separator 660 of FIG. 6L. The separator 665 may also include any number of longitudinal channels, and various separator components may include any suitable dimensions.

Figure 6N:
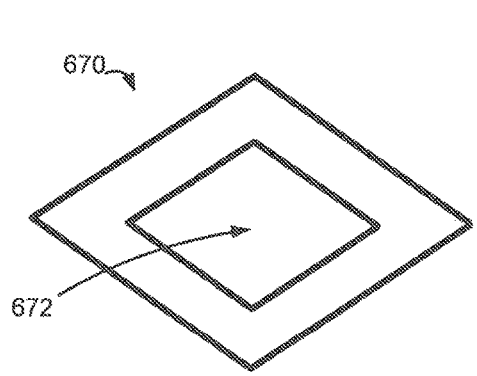
Figure 6O:
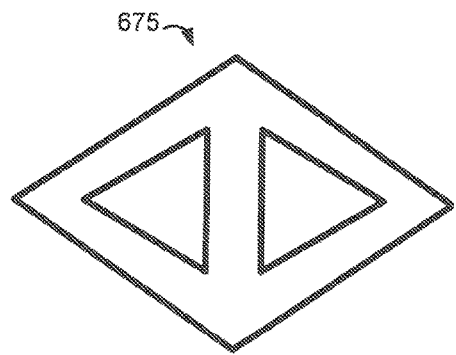

FIG. 6N illustrates an example separator 670 having a diamond shape. The separator 670 may include any number of longitudinal channels formed through a body portion, such as the illustrated longitudinal channel that also has a diamond shape. Other channels may include other shapes, and the various components of the separator 670 may include a wide variety of suitable dimensions. In other embodiments, as illustrated by the separator 675 depicted in FIG. 6O, one or more ribs or support segments may be incorporated into an internal cavity in order to form a plurality of longitudinal channels and/or to assist the diamond separator 675 in maintaining its shape. Much like the separator 630 of FIG. 6F, in certain embodiments, the ribs or support segments may be formed from one or more materials that are different from the material(s) utilized to form an outer portion of the separator 675.

Figure 6P:
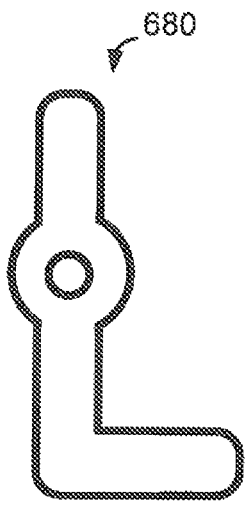
Figure 6Q:
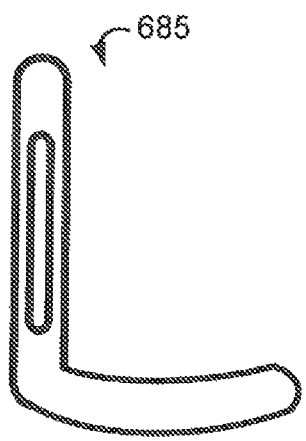

FIG. 6P illustrates an example separator 680 having an L-shape. The separator 680 may include a first portion or segment that bisects (or otherwise divides) a cable core, thereby forming two channels in which twisted pairs are disposed. Additionally, the separator 680 may include a second portion connected at one end of the first portion at an approximately 90 degree angle. The first portion may contact the second portion at one end of the second portion. The second portion may be configured to contact the outer jacket of a cable (or intermediate layer) and may assist in holding the separator 680 in place. FIG. 6Q illustrates an example separator 685 having a J-shape. The separator 685 illustrated in FIG. 6Q is a variation of the L-shaped separator 680 illustrated in FIG. 6P; however, the second portion may have a concave curve configured to contact an outer jacket (or intermediate layer). As an alternative to a J-shape separator, a second portion may have a convex shape configured to contact an outer jacket (or intermediate layer) of a cable. Each of the separators 680, 685 may include one or more longitudinal channels, and various components of the separators 680, 685 may be formed with a wide variety of suitable dimensions.

A wide variety of other suitable separators may be utilized in other embodiments. These separators may include any suitable shapes and/or dimensions. Additionally, separators may include any of the features and/or combination of features described and illustrated above with respect to FIGS. 4A-6Q. The separators discussed herein are provided by way of non-limiting example only.

Figure 7A:
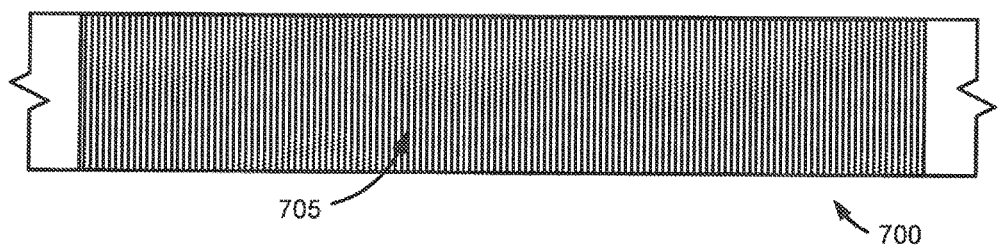
FIGS. 7A-7G are top level views of various configurations of electrically conductive material that may be incorporated into separators as desired in various embodiments of the disclosure.

As set forth above, a wide variety of different shielding configurations and/or arrangements of shielding material may be utilized in conjunction with separators, shields, and/or other shield elements. FIGS. 7A-7G illustrate top level views of example shielding material configurations that may be utilized in various embodiments. These configurations are applicable to one or more separator surfaces (e.g., an outer surface, the surface of a longitudinal channel, etc.), shielding layer surfaces, embedded layers of shielding material incorporating into a shield element, segments of a severed shield element, etc. With reference to FIG. 7A, an example shield element 770 may include relatively continuous shielding material 705. For example, a continuous patch of shielding material may be formed on a surface of the shielding element 770. As another example, a shielding structure 700 may be formed from a shielding material or impregnated with shielding material along its entire length.

Figure 7B:
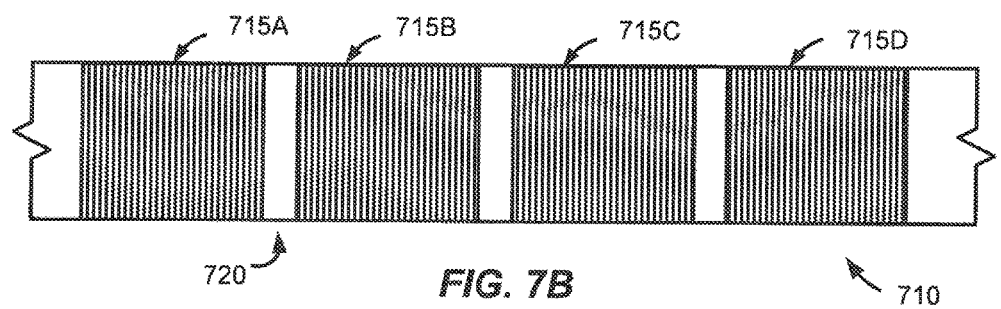

With reference to FIG. 7B, a top level view of another example shield element 710 is illustrated. The shield element 710 may include any number of rectangular patches of shielding material, such as patches 715A-D formed on a dielectric material or otherwise incorporated into the shield element. As desired in various embodiments, the patches 715A-D may include any desired lengths, and any desired gap 720 or separation distance may be provided between adjacent patches. In certain embodiments, the patches may be formed in accordance with a repeating pattern having a definite step or period. As desired, additional patches may be formed on an opposing side of the dielectric material to cover the gaps 720.

Figure 7C:
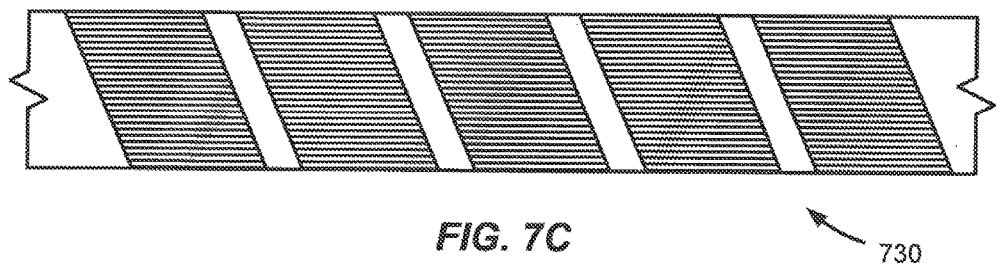
Figure 7D:
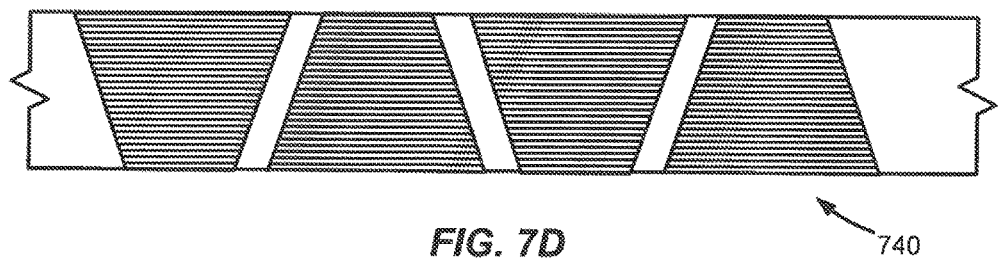

FIG. 7C illustrates a top level view of another example shield element 730. The shield element 730 may include any number of patches of shielding material having the shape of a parallelogram. In other words, the patches may be formed at an angle within one or more areas of the shield element 730. As shown, the patches may be formed at an acute angle with respect to the width dimension of the shield element 730. In certain embodiments, the acute angle facilitates manufacturing and/or enhances patch-to-substrate adhesion. Additionally, the acute angle may also facilitate the covering of opposing isolating spaces or gaps. In certain embodiments, benefit may be achieved when the acute angle is about 45 degrees or less. In other embodiments, benefit is achieved when the acute angle is about 35 degrees or less, about 30 degrees or less, about 25 degrees or less, about 20 degrees or less, or about 15 degrees or less. In other embodiments, benefit is achieved when the acute angle is between about 12 and 40 degrees. In certain embodiments, the acute angle may be in a range between any two of the degree values provided in this paragraph or a range bounded on a minimum or maximum end by one of the provided values. FIG. 7D illustrates a top level view of another example shield element 740 that may be utilized in various embodiments. The structure 740 may include any number of patches of shielding material having a trapezoidal shape. In certain embodiments, the orientation of adjacent trapezoidal patches may alternate. Similar to the patch pattern illustrated in FIG. 7C, the trapezoidal patches may provide manufacturing and/or shielding benefits.

Figure 7E:
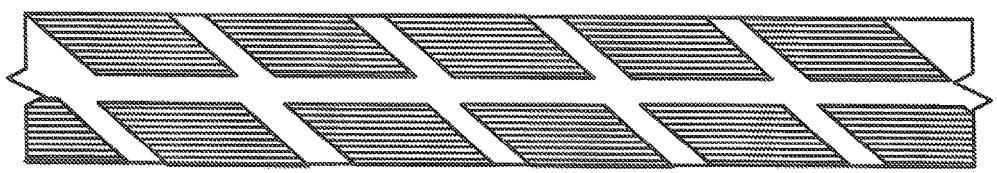

In certain embodiments, patches of shielding material may be formed across a dimension of a shield element, such as across a width dimension that is perpendicular to a longitudinally extending direction of the shield element. In other embodiments, multiple patches may be formed across a given dimension, such as a width dimension. FIG. 7E illustrates a top level view of an example shield element 750 in which multiple patches are formed across a width dimension. As desired, patches may be discrete or discontinuous along any dimension of the shield element 750 and/or across multiple dimensions (e.g., a width and a length dimension). Additionally, any number of patches may be formed across a given dimension. Each patch may have a wide variety of suitable dimensions (e.g., widths, lengths, etc.), and/or a wide variety of suitable separation gaps may be formed between adjacent patches.

Figure 7F:
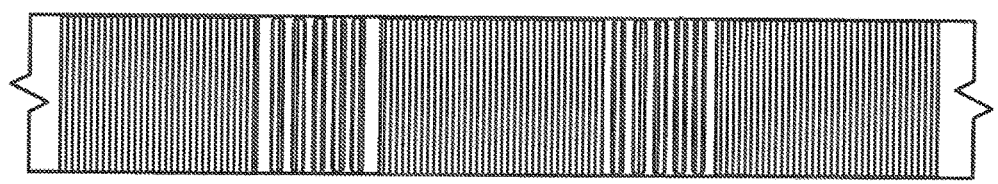

FIG. 7F illustrates a top level view of an example shield element 760 in which one or more respective microcuts are utilized to form gaps between adjacent patches of shielding material. In certain embodiments, the width of each of these microcuts may be less than or equal to approximately 0.25 mm. These relatively narrow microcuts may limit the leakage of the shield element 760, and therefore, reduce noise during electrical transmission using a cable. In certain embodiments, a series of microcuts may be placed in relatively close proximity to one another. For example, a series of microcuts may be formed as an alternative to a traditional space or gap between patches of shielding material. As one example, a conventional discontinuous shield may include gaps or spaces between adjacent patches that are at least approximately 0.050 inches (approximately 1.27 mm) wide. By contrast, a plurality of relatively narrow or fine microcuts (e.g., microcuts of approximately 0.25 mm, etc.) may be formed in an approximately 0.050 inch wide portion (or any other desired width) of a shield element. Additionally, it is noted that the use of singular or isolated microcuts within a shield element may allow electricity to arc across the microcuts, thereby leading to a safety hazard. However, a plurality of microcuts positioned or formed in relatively close proximity to one another may limit safety risks due to electrical arcing. Any electrical arcing across the microcut gaps will likely burn up or destroy the electrically conductive material between the closely spaced microcuts, thereby breaking or severing the electrical continuity of the shield element and preventing current from propagating down the shield element. In other words, the microcuts may be spaced and/or formed to result in a shield element that includes shielding material having a sufficiently low mass such that the shielding material will fuse or melt when current is applied.

Although the examples above describe situations in which conventional spaces or gaps are respectively replaced with a series of microcuts, a wide variety of other suitable configurations of microcuts may be utilized in other embodiments. For example, a shield element may include microcuts continuously spaced in close proximity to one another along a longitudinal length of the shield element. In other embodiments, sections or patches of microcuts may be spaced at regular intervals or in accordance with any desired pattern. Each section or patch may include at least two microcuts. A wide variety of suitable patterns may be formed by microcuts. For example, a section of microcuts (e.g., one section of a repeating pattern, etc.) may include microcuts having a perpendicular line pattern, a dashed vertical line pattern, a square pattern, an inverse square pattern, a diamond-shaped pattern, an inverse diamond-shaped pattern, a checkerboard pattern, an angled line pattern, a curved line pattern, or any other desired pattern. As another example, a section of microcuts may include microcuts that form one or more alphanumeric characters, graphics, and/or logos. In this regard, product identification information, manufacturer identification information, safety instructions, and/or other desired information may be displayed on a shield element. In yet other embodiments, sections or patches of microcuts may be positioned in random locations along a shield element. Additionally, a wide variety of suitable methods and/or techniques may be utilized to form microcuts. For example, one or more lasers may be utilized to form microcuts.

Figure 7G:
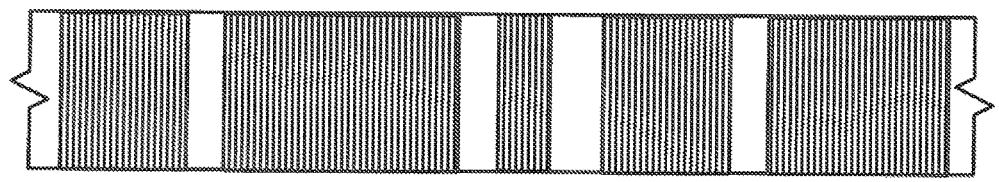

FIG. 7G depicts a top level view of another example shield element 770 that may be utilized in various embodiments. The shield element 770 may include a plurality of discontinuous patches or sections of shielding material that are formed in a random or pseudo-random manner. A wide variety of other suitable patch configurations and/or other configurations of shielding material may be utilized as desired in other embodiments, and the configurations discussed herein are provided by way of non-limiting example only.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable comprising:
   a plurality of twisted pairs of individually insulated electrical conductors;
   a separator extending lengthwise along a longitudinal length of the cable and positioned between at least two of the plurality of twisted pairs, the separator comprising:
   a flexible body configured to maintain the at least two pairs in a predetermined configuration;
   a first channel extending lengthwise and defining a longitudinal cavity through the separator; and
   a plurality of second channels extending from the first channel through the flexible body to an outer surface of the separator at the same cross-sectional point along the longitudinal length; and
   a jacket formed around the plurality of twisted pairs and the separator.

2. The cable of claim 1, wherein the first channel and the plurality of second channels provide for convective heat transfer along a longitudinal length of the cable.

3. The cable of claim 1, wherein the flexible body is formed at least in part from a polymeric material.

4. The cable of claim 1, wherein the plurality of second channels further comprises a plurality of second channels positioned at respective cross-sectional locations along the longitudinal length.

5. The cable of claim 1, wherein at least one of the plurality of second channels is formed perpendicular to the first channel.

6. The cable of claim 1, further comprising electrically conductive material formed on the surface of the first channel.

7. The cable of claim 6, wherein the electrically conductive material comprises a plurality of discontinuous patches of electrically conductive material.

8. The cable of claim 1, further comprising electrically conductive material formed on an outer surface of the flexible body.

9. The cable of claim 1, further comprising at least one heat sink positioned either (i) within the first channel or (ii) within the at least one second channel.

10. A cable comprising:
 a plurality of twisted pairs of individually insulated electrical conductors;
 a separator extending lengthwise and positioned between at least two of the plurality of twisted pairs, the separator configured to maintain the at least two pairs in a predetermined configuration and the separator comprising:
  a first channel extending lengthwise and defining a longitudinal cavity through the separator; and
  a plurality of second channels positioned at respective locations along a longitudinal length of the separator, each second channel extending from the first channel to an outer periphery of the separator; and
 a jacket formed around the plurality of twisted pairs and the separator.

11. The cable of claim 10, wherein at least one of the plurality of second channels is formed perpendicular to the first channel.

12. The cable of claim 10, further comprising electrically conductive material formed on the surface of the first channel.

13. The cable of claim 10, wherein the first channel extends approximately along a cross-sectional center line of the separator.

14. The cable of claim 10, wherein the longitudinal cavity comprises a first longitudinal cavity, and further comprising:
 a third channel extending lengthwise and parallel to the first channel, the third channel defining a second longitudinal cavity through the separator; and
 a plurality of fourth channels positioned at respective locations along a longitudinal length of the separator, each second channel extending from the third channel to an outer periphery of the separator.

15. The cable of claim 10, wherein the plurality of second channels comprises at least two channels positioned at the same location along the longitudinal length.

16. A cable comprising:
 a plurality of twisted pairs of individually insulated electrical conductors;
 a separator extending lengthwise and positioned between at least two of the plurality of twisted pairs, the separator having a cross-sectional shape with a central portion and a plurality of fins extending from the central portion, each of the plurality of fins extending between two of the plurality of twisted pairs, the separator comprising:
  a first channel extending lengthwise and defining a longitudinal cavity through the central portion of the separator, and
  a plurality of second channels positioned at respective locations along a longitudinal length of the separator, each second channel extending from the first channel to an outer periphery of the separator; and
 a jacket formed around the plurality of twisted pairs and the separator.

17. The cable of claim 16, wherein at least one of the plurality of second channels extends through the central portion such that it has a first opening within the first channel and a second opening positioned along the outer periphery between two of the plurality of fins.

18. The cable of claim 16, at least one of the plurality of second channels is formed perpendicular to the first channel.

19. The cable of claim 16, further comprising electrically conductive material formed on the surface of the first channel.

20. The cable of claim 16, further comprising electrically conductive material positioned within at least one of the plurality of second channels.

* * * * *